US011963078B2

United States Patent
Lee et al.

(10) Patent No.: US 11,963,078 B2
(45) Date of Patent: *Apr. 16, 2024

(54) APPARATUS AND METHOD FOR SUPPORTING ONE-TO-ONE COMMUNICATION SERVICE IN WIRELESS COMMUNICATION SYSTEM

(71) Applicant: Samsung Electronics Co., Ltd., Suwon-si (KR)

(72) Inventors: Hoyeon Lee, Suwon-si (KR); Sunghoon Kim, Suwon-si (KR); Yoonseon Han, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/532,868

(22) Filed: Nov. 22, 2021

(65) Prior Publication Data

US 2022/0086610 A1    Mar. 17, 2022

Related U.S. Application Data

(63) Continuation of application No. 16/834,798, filed on Mar. 30, 2020, now Pat. No. 11,184,748.

(30) Foreign Application Priority Data

Mar. 29, 2019   (KR) .......................... 10-2019-0037305

(51) Int. Cl.
*H04W 76/11*     (2018.01)
*H04W 4/40*      (2018.01)
(Continued)

(52) U.S. Cl.
CPC .............. *H04W 4/40* (2018.02); *H04W 8/22* (2013.01); *H04W 76/14* (2018.02)

(58) Field of Classification Search
CPC ......... H04W 4/40; H04W 8/22; H04W 76/14; H04W 8/24; H04W 76/11; H04W 4/46; H04W 4/70; H04W 4/44; H04W 92/18
See application file for complete search history.

(56) References Cited

U.S. PATENT DOCUMENTS 10,194,459 B2 *   1/2019   Kim ...................... H04W 72/21
11,184,748 B2 *  11/2021   Lee ......................... H04W 4/40
2020/0296619 A1    9/2020   Pan et al.

FOREIGN PATENT DOCUMENTS

WO         2020204530 A1    10/2020

OTHER PUBLICATIONS

International Search Report and Written Opinion of the International Searching Authority in connection with International Application No. PCT/KR2020/004328 dated Jul. 9, 2020, 9 pages.

(Continued)

*Primary Examiner* — Joseph E Dean, Jr.

(57) ABSTRACT

A method, performed by a first user equipment (UE), of performing unicast communication includes transmitting a direct communication request message, generating a profile for a PC5 unicast link, receiving, from a second UE, a response message based on a result of establishment of the PC5 unicast link; and transmitting, to the second UE, a data message over the PC5 unicast link based on the response message, wherein the profile includes at least one of a Layer-2 identifier (ID) of the first UE, an application layer ID of the first UE, a Layer-2 ID of the second UE, an application layer ID of the second UE, PC5 5th generation (5G) Quality of Service (QoS) Indicator (PQI), or PC5 QoS Flow identifier (PFI) associated with the PQI.

14 Claims, 13 Drawing Sheets

(51) Int. Cl.
*H04W 8/22* (2009.01)
*H04W 76/14* (2018.01)

(56) References Cited

OTHER PUBLICATIONS

Ericsson, "Update consistently use of V2X communication," S2-1902604 (rev of 1621), 3GPP SA WG2 Meeting #131, Tenerife, Spain, Feb. 25-Mar. 1, 2019, 5 pages.

Intel, "Update to V2X Policy and parameters," S2-1901885 (revision of S2-190xxxx), SA WG2 Temporary Document, SA WG2 Meeting #131, Santa Cruz, Tenerife, Spain, Feb. 25-Mar. 1, 2019, 2 pages.

LG Electronics, et al., "TS 23.287 Procedure for PC5 unicast," S2-1901810 (revision of S2-19xxxxx), SA WG2 Temporary Document, SA WG2 Meeting #131, Santa Cruz, Tenerife, Spain, Feb. 25-Mar. 1, 2019, 5 pages.

3GPP TS 23.287 V0.2.0 (Mar. 2019), Technical Specification, 3rd Generation Partnership Project; Technical Specification Group Services and System Aspects; Architecture enhancements for 5G System (5GS) to support Vehicle-to-Everything (V2X) services (Release 16), Mar. 2019, 31 pages.

Supplementary European Search Report dated Feb. 7, 2022, in connection with European Application No. 20782361.8, 7 pages.

Qualcomm Incorporated, et al., "TS 23.287: Identifiers for V2X communication over PC5," S2-1900709 (was S2-1900355), SA WG2 Meeting #130, Kochi, India, Jan. 21-25, 2019, 3 pages.

Communication pursuant to Article 94(3) EPC dated Nov. 4, 2022, in connection with European Application No. 20782361.8, 6 pages.

Office Action dated Oct. 20, 2023, in connection with Korean Patent Application No. 10-2019-0037305, 125 pages.

3GPP TR 23.786 V16.0.0 (Mar. 2019) (Mar. 2019); Technical Report; 3rd Generation Partnership Project; Technical Specification Group Services and System Aspects; Study on architecture enhancements for the Evolved Packet System (EPS) and the 5G System (5GS) to support advanced V2X services(Release 16); 118 pages.

\* cited by examiner

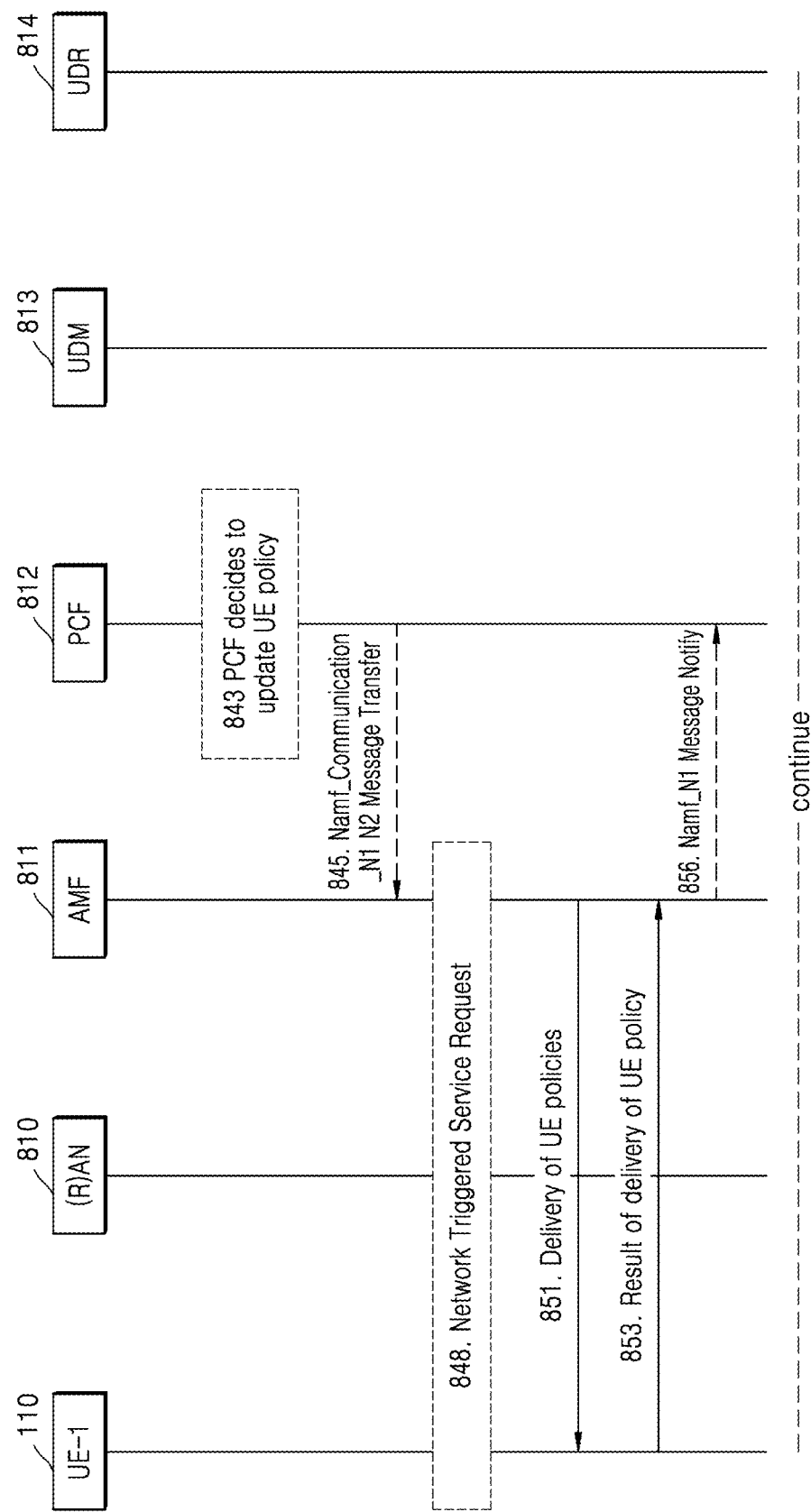

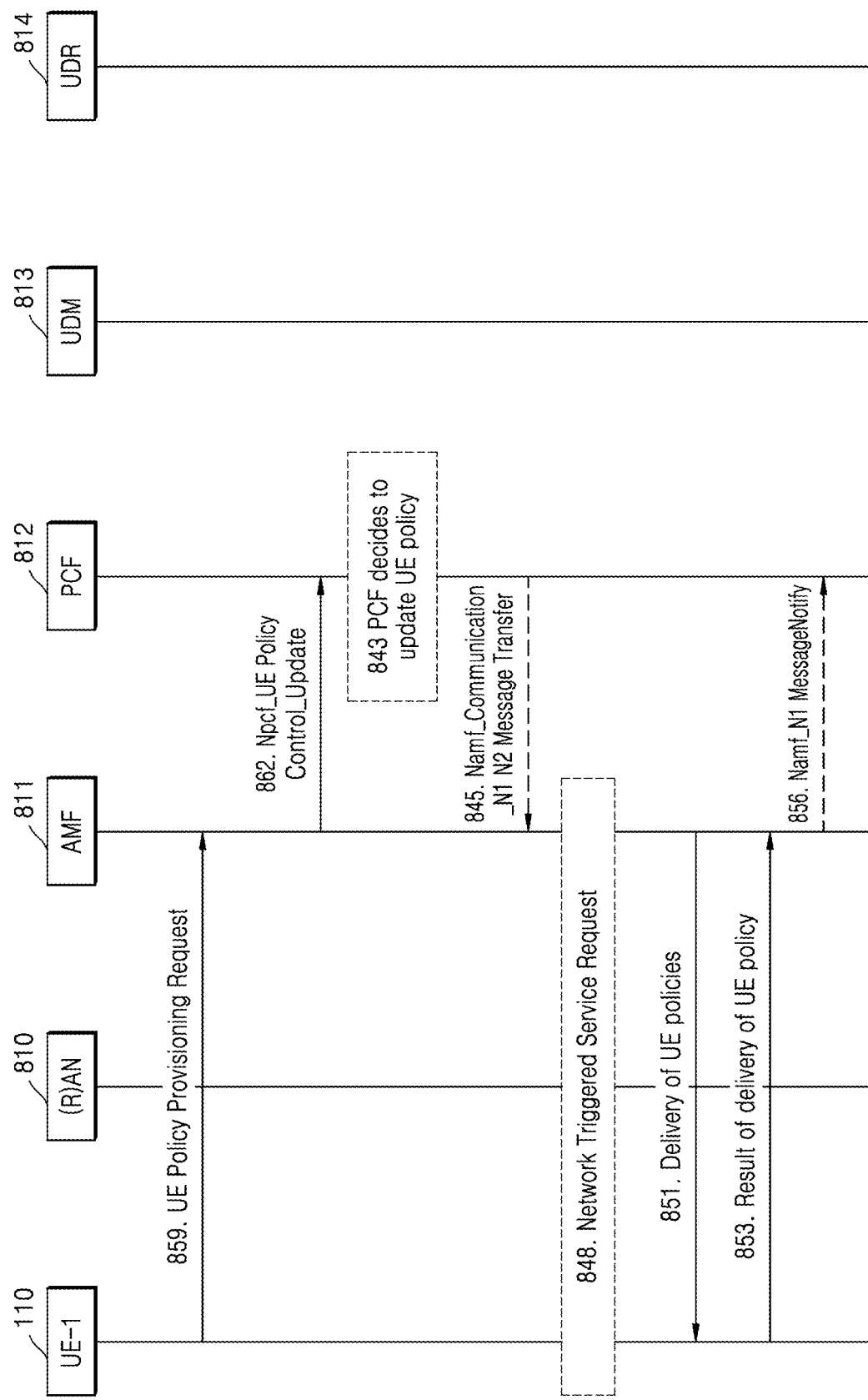

APPARATUS AND METHOD FOR SUPPORTING ONE-TO-ONE COMMUNICATION SERVICE IN WIRELESS COMMUNICATION SYSTEM

CROSS-REFERENCE TO RELATED APPLICATION

This application is a continuation of application Ser. No. 16/834,798, filed Mar. 30, 2020, now U.S. Pat. No. 11,184,748, which is based on and claims priority under 35 U.S.C. § 119 to Korean Patent Application No. 10-2019-0037305, filed on Mar. 29, 2019, in the Korean Intellectual Property Office, the disclosures of which are incorporated by reference herein in their entirety.

BACKGROUND

1. Field

The present disclosure relates to a method and apparatus for supporting a one-to-one communication service in a wireless communication system.

2. Description of Related Art

To meet the increasing demand for wireless data traffic after the commercialization of $4^{th}$ Generation (4G) communication system, efforts to develop an enhanced $5^{th}$ Generation (5G) communication system or a pre-5G communication system are continuing. For this reason, a 5G communication system or pre-5G communication system is called a Beyond 4G Network communication system or a Post Long Term Evolution (LTE) system.

To achieve a high data transmission rate, the implementation of a 5G communication system in an ultra-high-frequency (mmWave) band (for example, a 60 GHz band) is being considered. To reduce path loss of radio waves and increase a transfer distance of radio waves in an ultra-high-frequency band, in a 5G communication system, technologies for beamforming, massive Multiple Input Multiple Output (MIMO), Full Dimensional MIMO (FD-MIMO), array antenna, analog beam-forming, and large-scale antenna are being discussed.

Also, to improve the network of the system, various technologies, such as evolved small cell, advanced small cell, cloud radio access network (cloud RAN), ultra-dense networks, Device to Device communication (D2D), wireless backhaul, moving networks, cooperative communication, Coordinated Multi-Points (CoMP), and interference cancellation, have been developed for 5G communication systems. In addition, other technologies, such as Hybrid frequency-shift keying (FSK) and quadrature amplitude modulation (QAM) Modulation (FQAM) and Sliding Window Superposition Coding (SWSC) based on Advanced Coding Modulation (ACM) and Non Orthogonal Multiple Access (NOMA) and Sparse Code Multiple Access (SCMA) based on Filter Bank Multi Carrier (FBMC), have been developed for 5G communication systems.

Meanwhile, the Internet is evolving from a human-centered network in which humans generate and consume information to an Internet of Things (IoT) network in which distributed components such as objects, transmit and receive information and process it. Internet of Everything (IoE) technology resulting from combining IoT technology with big data processing technology, etc. through a connection to a cloud server or the like is on the rise. To implement the IoT, various technical factors, such as sensing technology, wired/wireless communication, network infrastructure, service interface technology, and security technology, are required. Recently, technologies including a sensor network, Machine to Machine (M2M), and Machine Type Communication (MTC) for connections between objects have been studied.

In an IoT environment, an intelligent Internet Technology (IT) service is provided to collect and analyze data generated by connected objects to create new values for human life. The IoT may be applied to various fields, such as smart homes, smart buildings, smart cities, smart cars/connected cars, smart grids, health care, smart appliances, and advanced medical services, through convergence and combination between existing Information Technology (IT) and various industries.

Accordingly, various attempts to apply a 5G communication system to an IoT network are being made. For example, technologies, such as a sensor network, M2M, and MTC, are implemented by technologies, such as beam forming, MIMO, and array antenna, which are 5G communication technologies. Applying a cloud radio access network (CRAN) as big data processing technology also is an example of the convergence of 5G technology and IoT technology.

Vehicle to Everything (V2X) is a general term indicating all forms of communication methods that are applicable to vehicles on roads, and the V2X is combined with the development of wireless communication technologies to enable various additional services as well as initial safety use cases.

As technology providing a V2X service, a Wireless Access in Vehicular Environments (WAVE) standard based on IEEE 802.11p and IEEE P1609 has been standardized. However, WAVE, which is a kind of Dedicated Short Range Communication (DSRC) technology, has a limitation in that a message transmission distance between vehicles is restricted.

To overcome such a limitation, cellular-based V2X technology is being standardized by the $3^{rd}$ Generation Partnership Project (3GPP). In Release 14/Release 15, an Evolved Packet System (EPS) V2X standard based on an LTE system has been completed, and in Release 16, standardization of $5^{th}$ Generation System (5GS) V2X based on a New Radio (NR) system is being conducted.

SUMMARY

According to some embodiments of the disclosure, an operating method of a first user equipment includes acquiring first information for communication link establishment with second user equipment, transferring second information from an application layer to a Service Enabling (SE) layer, based on the first information; configuring a layer-2 ID of the first user equipment to a source layer-2 ID of a direct communication request message by the SE layer; transmitting the direct communication request message to the second user equipment when a procedure for the communication link establishment is determined to be performed based on the second information and receiving a direct communication response message from the second user equipment, based on the direct communication request message.

According to various embodiments of the disclosure, an operating method of a second user equipment includes receiving a direct communication request message from a first user equipment, checking a destination address of the direct communication request message to determine whether to perform communication link establishment with the first user equipment by a Service Enabling (SE) layer, and transmitting a direct communication response message to the first user equipment when the communication link establishment is determined to be performed.

Additional aspects will be set forth in part in the description which follows and, in part, will be apparent from the description, or may be learned by practice of the presented embodiments of the disclosure.

According to certain embodiments of this disclosure, a method, performed by a first user equipment (UE), of performing unicast communication includes transmitting a direct communication request message, generating a profile for a PC5 unicast link, receiving, from a second UE, a response message based on a result of establishment of the PC5 unicast link; and transmitting, to the second UE, a data message over the PC5 unicast link based on the response message, wherein the profile includes at least one of a Layer-2 identifier (ID) of the first UE, an application layer ID of the first UE, a Layer-2 ID of the second UE, an application layer ID of the second UE, PC5 $5^{th}$ generation (5G) Quality of Service (QoS) Indicator (PQI), or PC5 QoS Flow identifier (PFI) associated with the PQI.

According to various embodiments, the Layer-2 ID of the second UE and the Layer-2 ID of the first UE may be used for initial signaling to establish the PC5 unicast link, and a destination Layer-2 ID of the direct communication request message may be the Layer-2 ID of the second UE.

The destination Layer-2 ID may be equal to or different from Vehicle to Everything (V2X) service types.

The PFI may be assigned in a V2X layer of the first UE, and the V2X layer of the first UE may provide at least one of the data message, the PFI, or the PQI to an Access Stratum (AS) layer of the first UE.

In certain embodiments, the method may further include indicating, from a V2X layer to an AS layer, whether the direct communication request message or the response message is for signaling.

The method may further include changing at least one of the Layer-2 ID of the first UE, the Layer-2 ID of the second UE, the application layer ID of the first UE, or the application layer ID of the second UE.

The method may further include updating the profile based on update of a link layer identifier or a result of the changing of at least one of the Layer-2 ID of the first UE, the Layer-2 ID of the second UE, the application layer ID of the first UE, or the application layer ID of the second UE.

In various embodiments according to this disclosure, the direct communication request message may include first information about at least one of the PQI or the PFI, and the response message may include second information about at least one of the PQI or PFI.

According to certain embodiments of the disclosure, a first user equipment (UE) for performing unicast communication includes: a transceiver; and at least one processor coupled with the transceiver and configured to: transmit a direct communication request message based on a profile; determine a profile for a PC5 unicast link; receive, from a second UE, a response message based on a result of establishment of the PC5 unicast link; and transmit, to the second UE, a data message over the PC5 unicast link based on the response message, wherein the profile includes at least one of a Layer-2 identifier (ID) of the first UE, an application layer ID of the first UE, a Layer-2 ID of the second UE, an application layer ID of the second UE, PC5 $5^{th}$ generation (5G) Quality of Service (QoS) Indicator (PQI), or PC5 QoS Flow identifier (PFI) associated with the PQI.

In some embodiments, the Layer-2 ID of the second UE and the Layer-2 ID of the first UE may be used for initial signaling to establish the PC5 unicast link, and a destination Layer-2 ID of the direct communication request message may be the Layer-2 ID of the second UE.

The destination Layer-2 ID may be equal to or different from Vehicle to Everything (V2X) service types.

The PFI may be assigned in a V2X layer of the first UE, and the V2X layer of the first UE may provide at least one of the data message, the PFI, or the PQI to an Access Stratum (AS) layer of the first UE.

The at least one processor may be further configured to indicate, from a V2X layer to an AS layer, whether the direct communication request message or the response message is for signaling.

The at least one processor may be further configured to change at least one of the Layer-2 ID of the first UE, the Layer-2 ID of the second UE, the application layer ID of the first UE, or the application layer ID of the second UE.

According to some embodiments, the at least one processor may be further configured to update the profile based on update of a link layer identifier or a result of the change of at least one of the Layer-2 ID, the application layer ID of the first UE, or the application layer ID of the second UE.

The direct communication request message may include first information about at least one of the PQI or the PFI, and the response message may include second information about at least one of the PQI or PFI.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 8B illustrates an example of a procedure performed by a user equipment to acquire service information from a network in response to a request from the network, according to certain embodiments of the disclosure;

FIG. 8C illustrates an example of a procedure performed by a user equipment to acquire service information from a network in response to a request from the user equipment, according to certain embodiments of the disclosure;

DETAILED DESCRIPTION

Figure 1:
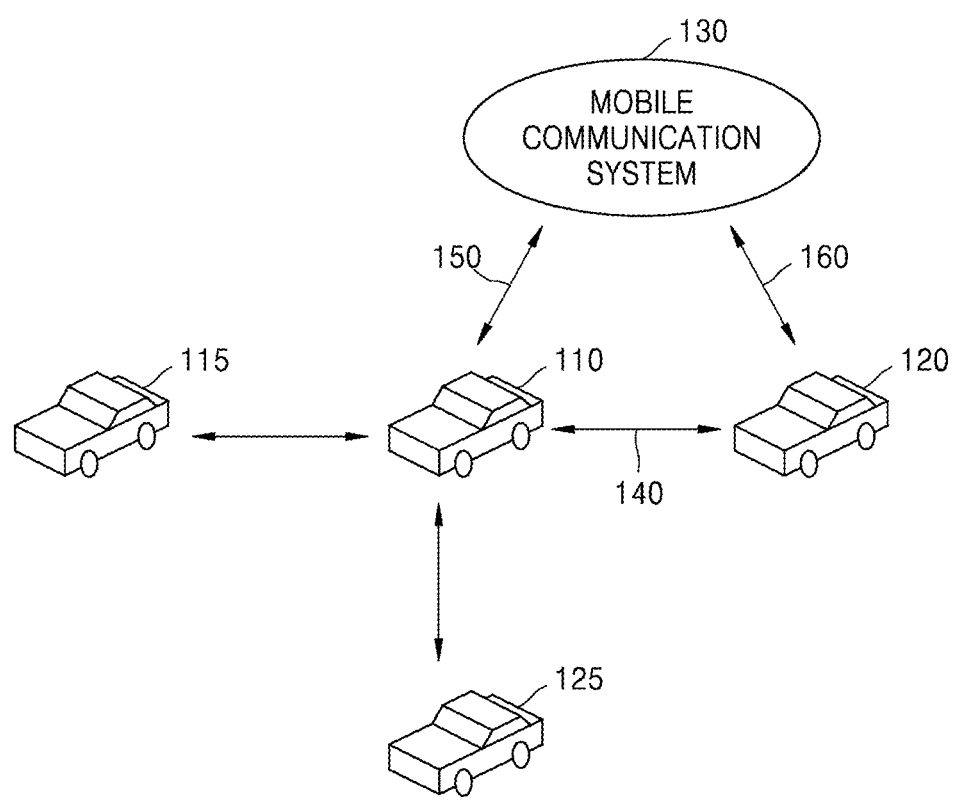
FIG. 1 illustrates an example of a configuration of a vehicle communication system according to certain embodiments of the disclosure.

FIGS. 1 through 9B, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, operational principles of the disclosure will be described in detail with reference to the accompanying drawings. However, when detailed descriptions about known functions or configurations associated with the disclosure are determined to unnecessarily obscure the gist of the disclosure, the detailed descriptions will be omitted. Although the following terms are defined in consideration of the functions of the disclosure, they may vary according to a user or operator's intentions, judicial precedents, etc. Hence, the terms must be defined based on the contents of the entire specification.

For the same reason, some components shown in the drawings may be exaggerated or schematically shown, or some components may be omitted. Also, the sizes of the components may not reflect actual sizes. In the drawings, the same or corresponding components are assigned like reference numerals.

Throughout the disclosure, the expression "at least one of a, b or c" indicates only a, only b, only c, both a and b, both a and c, both b and c, all of a, b, and c, or variations thereof.

Examples of a terminal may include a user equipment (UE), a mobile station (MS), a cellular phone, a smartphone, a computer, or a multimedia system capable of performing a communication function.

As used in the present disclosure, the term controller encompasses a processor. Throughout the specification, a layer (or a layer apparatus) may also be referred to as an entity.

Advantages and features of the disclosure and a method for achieving them will be clear with reference to the accompanying drawings, in which embodiments are shown. Embodiments according to this disclosure may take many different forms and the scope of this disclosure should not be construed as being limited to the embodiments set forth herein; rather, these embodiments are provided so that the disclosure will be thorough and complete, and will fully convey the concept of the disclosure to those of ordinary skill in the art, and the disclosure is only defined by the scope of the claims. Like reference numerals denote like elements throughout the specification.

It will be appreciated that the combinations of blocks and flowchart illustrations in the process flow diagrams may be performed by computer program instructions. These computer program instructions may be loaded into a processor of a general purpose computer, a special purpose computer, or other programmable data processing equipment, so that those instructions, which are executed through a processor of a computer or other programmable data processing equipment, create means for performing functions described in the flowchart block(s). These computer program instructions may also be stored in a computer usable or computer readable memory capable of directing a computer or other programmable data processing equipment to implement the functions in a particular manner so that the instructions stored in the computer usable or computer readable memory are also capable of producing manufacturing items containing instruction means for performing the functions described in the flowchart block(s). Computer program instructions may also be installed on a computer or other programmable data processing equipment so that a series of operating steps may be performed on a computer or other programmable data processing equipment to create a computer-executable process. Therefore, it is also possible for the instructions to operate the computer or other programmable data processing equipment to provide steps for executing the functions described in the flowchart block(s).

In addition, each block may represent a module, segment, or portion of code that includes one or more executable instructions for executing specified logical function(s). It should also be noted that in some alternative implementations, the functions mentioned in the blocks may occur out of order. For example, two blocks shown in succession may actually be executed substantially concurrently, or the blocks may sometimes be performed in reverse order according to the corresponding function.

As used herein, the terms 'portion', 'module', or 'unit' refers to a unit that can perform at least one function or operation, and may be implemented as a software or hardware component such as a Field Programmable Gate Array (FPGA) or an Application Specific Integrated Circuit (ASIC). However, the term 'portion', 'module' or 'unit' is not limited to software or hardware. The 'portion', 'module', or 'unit' may be configured in an addressable storage medium, or may be configured to run on at least one processor. Therefore, as an example, the 'portion', 'module', or 'unit' includes: components such as software components, object-oriented software components, class components, and task components; processors, functions, attributes, procedures, sub-routines, segments of program codes, drivers, firmware, microcodes, circuits, data, databases, data structures, tables, arrays, and variables. Functions provided in the components and 'portions', 'modules' or 'units' may be combined into a smaller number of components and 'portions', 'modules' and 'units', or sub-divided into additional components and 'portions', 'modules' or 'units'. Also, the components and 'portions', 'modules' or 'units' may be configured to run on one or more Central Processing Units (CPUs) in a device or a security multimedia card. Also, in the embodiments, the 'portion', 'module' or 'unit' may include one or more processors.

As used herein, terms indicating connection nodes, terms indicating network entities, terms indicating messages, terms indicating interfaces between the network entities, terms indicating various identification information, etc. are examples for convenience of description. Accordingly, the disclosure is not limited to the terms, and other terms having the equivalent technical meanings may be used.

Hereinafter, for convenience of description, terms and names defined in standards for $5^{th}$ Generation (5G), New Radio (NR), and a Long Term Evolution (LTE) system are used in the disclosure. However, the disclosure is not limited by terms and names, and may be applied in the same way to system based on other standards.

The detailed descriptions of embodiments of the disclosure may be provided with reference to terms and concepts set forth in one or more communication standards defined by the $3^{rd}$ Generation Partnership Project (3GPP). However, embodiments according to this disclosure may be practiced in other communication systems having similar technical backgrounds through slight modifications consistent with the instant disclosure, as informed by the technical knowledge of a person of ordinary skill in the technical art to which the disclosure pertains.

The detailed descriptions of the embodiments of the disclosure are in certain cases, described with reference to a vehicle communication service. However, the embodiments according to this disclosure are not limited by the choice of explanatory examples herein and the disclosure may be applied to other services that are provided on a 5G network.

A 5G system supports various services of a 4G system. For example, representative services include an enhanced mobile broad band (eMBB), ultra-reliable and low latency communication (URLLC), massive machine type communication (mMTC), and evolved multimedia broadcast/multicast Service (eMBMS). A system providing a URLLC service is called a URLLC system, and a system providing an eMBB service is called eMBB system. Also, the terms 'service' and 'system' may be used interchangeably.

The URLLC service has not been considered in the 4G system and is newly considered in the 5G system. The URLLC service requires conditions of ultra high-reliability (for example, a packet error rate of about $10^{-5}$) and low latency (for example, about 0.5 msec) compared to other services. To meet such strict requirements, the URLLC service may need application of a transmission time interval (TTI) that is shorter than the eMBB service, and various operation methods using the URLLC service are considered.

Meanwhile, the Internet is evolving from a human-centered network on which humans generate and consume information to an Internet of Things (IoT) network on which distributed components such as objects information transmit and receive information and process it. Internet of Everything (IoE) technology resulting from combining IoT technology with big data processing technology, etc. through a connection to a cloud server or the like is on the rise. To implement the IoT, various technical factors, such as sensing technology, wired/wireless communication, network infrastructure, service interface technology, and security technology, are required. Recently, technologies including a sensor network, Machine to Machine (M2M), and Machine Type Communication (MTC) for connections between objects are being studied.

FIG. 1 illustrates an example of a configuration of a vehicle communication system according to certain embodiments of the disclosure.

Referring to the non-limiting example of FIG. 1, a user equipment (UE) (which, according to this disclosure, encompasses, without limitation, a user terminal, a terminal, or a vehicle user equipment) 110 may communicate with another user equipment 120 by using direct communication (for example, Device-to-Device (D2D), ProSe, PC5, and Sidelink communication) 140 or network communication 150 and 160 through a mobile communication system 130. In the direct communication 140, message transmission/reception between the user equipment 110 and the other user equipment 120 may be conducted through a PC5 link. In the network communication 150 and 160, a message that will be sent from a transmission vehicle user equipment to reception a vehicle user equipment may be transmitted to a network through a Uu link and then transmitted to the reception vehicle user equipment through the Uu link. The mobile communication system 130 may be an Evolved Packet Core (EPC) system or a $5^{th}$ Generation Core (5GC) system defined in the 3GPP, or another communication system than the 3GPP. The direct communication 140 may be provided by using Long Term Evolution Radio Access Technology (LTE RAT), NR RAT, or non-3gpp RAT such as Wireless Fidelity (WiFi).

Figure 2A:
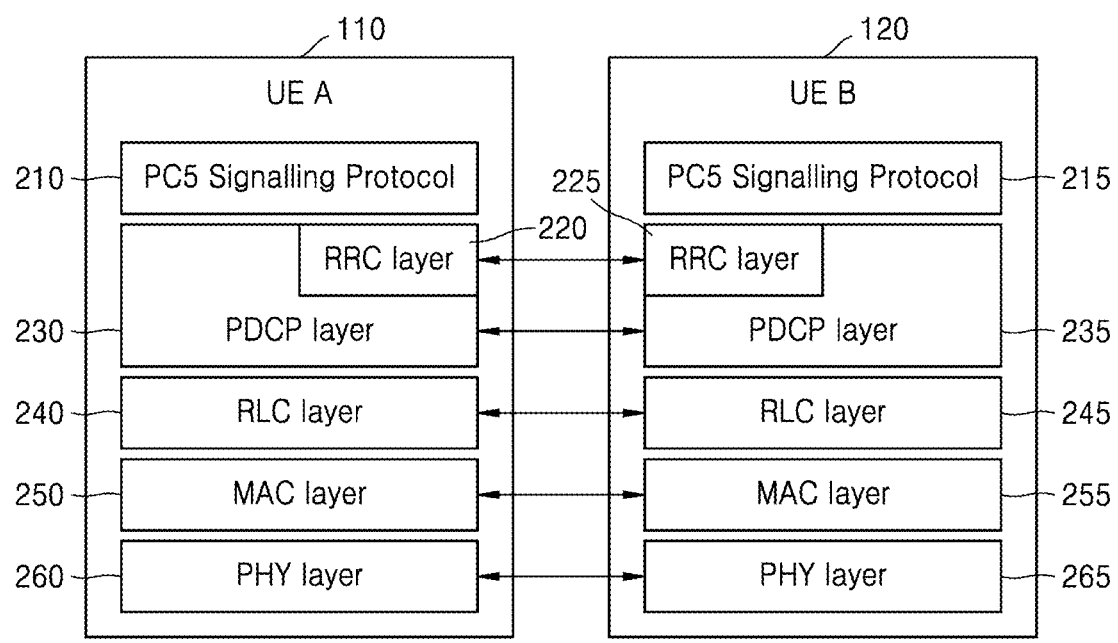
FIG. 2A illustrates an example of control plane protocol stacks of a user equipment according to certain embodiments of the disclosure.
Figure 2B:
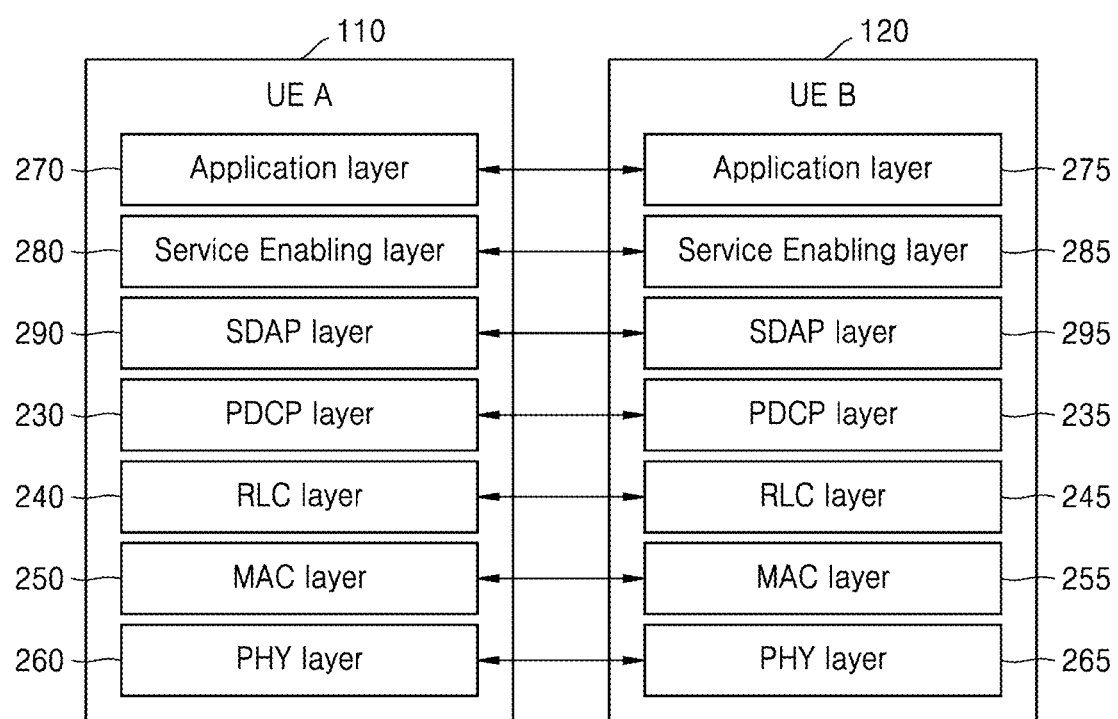
FIG. 2B illustrates an example of user plane protocol stacks of a user equipment according to certain embodiments of the disclosure.

FIG. 2A illustrates an example of control plane protocol stacks of a user equipment according to certain embodiments of the disclosure. FIG. 2B illustrates an example user plane protocol stacks of a user equipment according to certain embodiments of the disclosure. Referring to the non-limiting example of FIG. 2A, the user equipment 110 may be a transmission user equipment, and the user equipment 120 may be a reception user equipment. However, for convenience of description, the transmission user equipment and the reception user equipment will be referred to as the user equipment 110 and the user equipment 120, respectively.

Referring to the illustrative example of FIG. 2A, control plane protocol stacks of the user equipment 110 and 120 may be composed of PC5 Signalling Protocol layers 210 and 215, RRC layers 220 and 225, PDCP layers 230 and 235, RLC layers 240 and 245, MAC layers 250 and 255, and PHY layers 260 and 265. The RRC layers 220 and 225, the PDCP layers 230 and 235, the RLC layers 240 and 245, and the MAC layers 250 and 255 are collectively referred to as Access Stratum layers.

The PC5 Signalling Protocol layers 210 and 215 may provide a function of link establishment and link maintenance for the direct communication 140 between the user equipment 110 and the user equipment 120. The SE layers 280 and 285 may include an internet protocol (IP), a non-IP, and a transport protocol (for example, a transmission control protocol (TCP) or a user datagram protocol (UDP)) to transmit messages.

The user equipment 110 and 120 according to certain embodiments of the disclosure may acquire information shown in Table 1 from a network through a procedure shown in FIG. 8, and store the information to use the V2X service. The SE layers 280 and 285 may use the stored information.

TABLE 1

V2X Service Policy Parameters

1) Authorization policy:
When the UE is "served by E-UTRA" or "served by NR":
PLMNs in which the UE is authorized to perform V2X communications over PC5 reference point when "served by E-UTRA" or "served by NR".
For each above PLMN:
RAT(s) over which the UE is authorized to perform V2X communications over PC5 reference point.
When the UE is "not served by E-UTRA" and "not served by NR":
Indicates whether the UE is authorized to perform V2X communications over PC5 reference point when "not served by E-UTRA" and "not served by NR".
RAT(s) over which the UE is authorized to perform V2X communications over PC5 reference point.
2) Radio parameters when the UE is "not served by E-UTRA" and "not served by NR":
Includes the radio parameters per PC5 RAT (i.e. LTE PC5, NR PC5) with Geographical Area(s) and an indication of whether they are "operator managed" or "non-operator managed". The UE uses the radio parameters to perform V2X communications over PC5 reference point when "not served by E-UTRA" and "not served by NR" only if the UE can reliably locate itself in the corresponding Geographical Area. Otherwise, the UE is not authorized to transmit.
NOTE: Whether a frequency band is "operator managed" or "non-operator managed" in a given Geographical Area is defined by local regulations.
3) Policy/parameters per RAT for PC5 Tx Profile selection:
The mapping of service types (e.g. PSID or ITS-AIDs) to Tx Profiles.
4) Policy/parameters related to privacy:
The list of V2X services, e.g. PSID or ITS-AIDs of the V2X applications, with Geographical Area(s) that require privacy support.
5) Policy/parameters when NR PC5 is selected:
The mapping of service types (e.g. PSID or ITS-AIDs) to V2X frequencies with Geographical Area(s).
The destination Layer-2 ID for PC5 unicast link establishment.
The list of V2X services that are allowed to use a specific PQI(s)

nance for the direct communication 140 between the user equipment 110 and the user equipment 120.

Referring to the non-limiting example of FIG. 2B, user plane protocol stacks of the user equipment 110 and 120 may be composed of Application layers 270 and 275, Service Enabling (SE) layers 280 and 285, SDAP layers 290 and 295, PDCP layers 230 and 235, RLC layers 240 and 245, MAC layers 250 and 255, and PHY layers 260 and 265. The SDAP layers 290 and 295, the PDCP layers 230 and 235, the RLC layers 240 and 245, and the MAC layers 250 and 255 are collectively referred to as Access Stratum (AS) layers.

In certain embodiments, SE layers 280 and 285 may be intermediate layers for performing operations of the application layers 270 and 275, and provide a function specialized for each application or service. A SE layer may support a plurality of application layers. Also, a SE layer specialized for each application layer may be defined. For example, to provide a V2X service, the application layers 270 and 275 may be V2X application layers. Also, to perform operations of the V2X application layers, the SE layers 280 and 285 may be defined as V2X layers. Hereinafter, to provide a V2X service, the application layers 270 and 275 may be interchangeable with V2X application layers, and the SE layers 280 and 285 may be interchangeable with V2X layers.

The SE layers 280 and 285 may provide a data transfer function on a link established for the direct communication The SDAP layers 290 and 295 may be, after a link for the direct communication 140 between the user equipment 110 and the user equipment 120 is established, used to transmit data on the established link. For example, when a link for the direct communication 140 between the user equipment 110 and the user equipment 120 is established and then data is transmitted on the established link (for example, PC5 unicast communication or PC5 group cast), the SDAP layers 290 and 295 may be used for message transmission. Also, when data is transmitted without establishing a link for the direct communication 140 between the user equipment 110 and the user equipment 120 (for example, PC5 broadcast communication), the SDAP layers 290 and 295 may be not used for message transmission.

The PC5 signalling protocol layers 210 and 215 according to certain embodiments of the disclosure may include a function that is provided by the SE layers 280 and 285. Alternatively, the PC5 signalling protocol layers 210 and 215 may interact with the SE layers 280 and 285 for link establishment and/or link maintenance.

Figure 3:
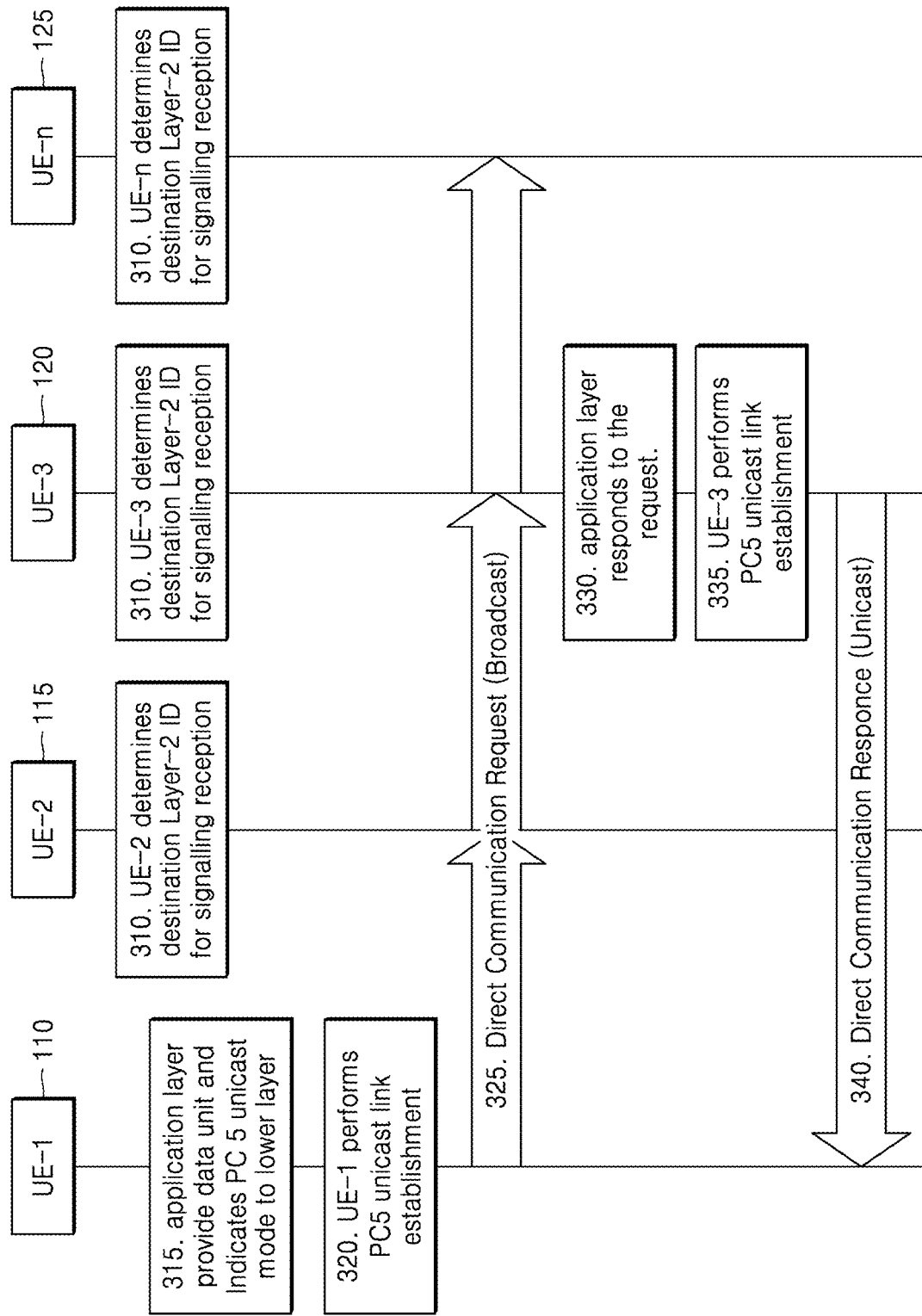
FIG. 3 illustrates an example of a procedure for direct communication link establishment according to certain embodiments of the disclosure.

FIG. 3 illustrates an example of a procedure for direct communication link establishment (ProSe link establishment) according to certain embodiments of the disclosure.

Figure 8A:
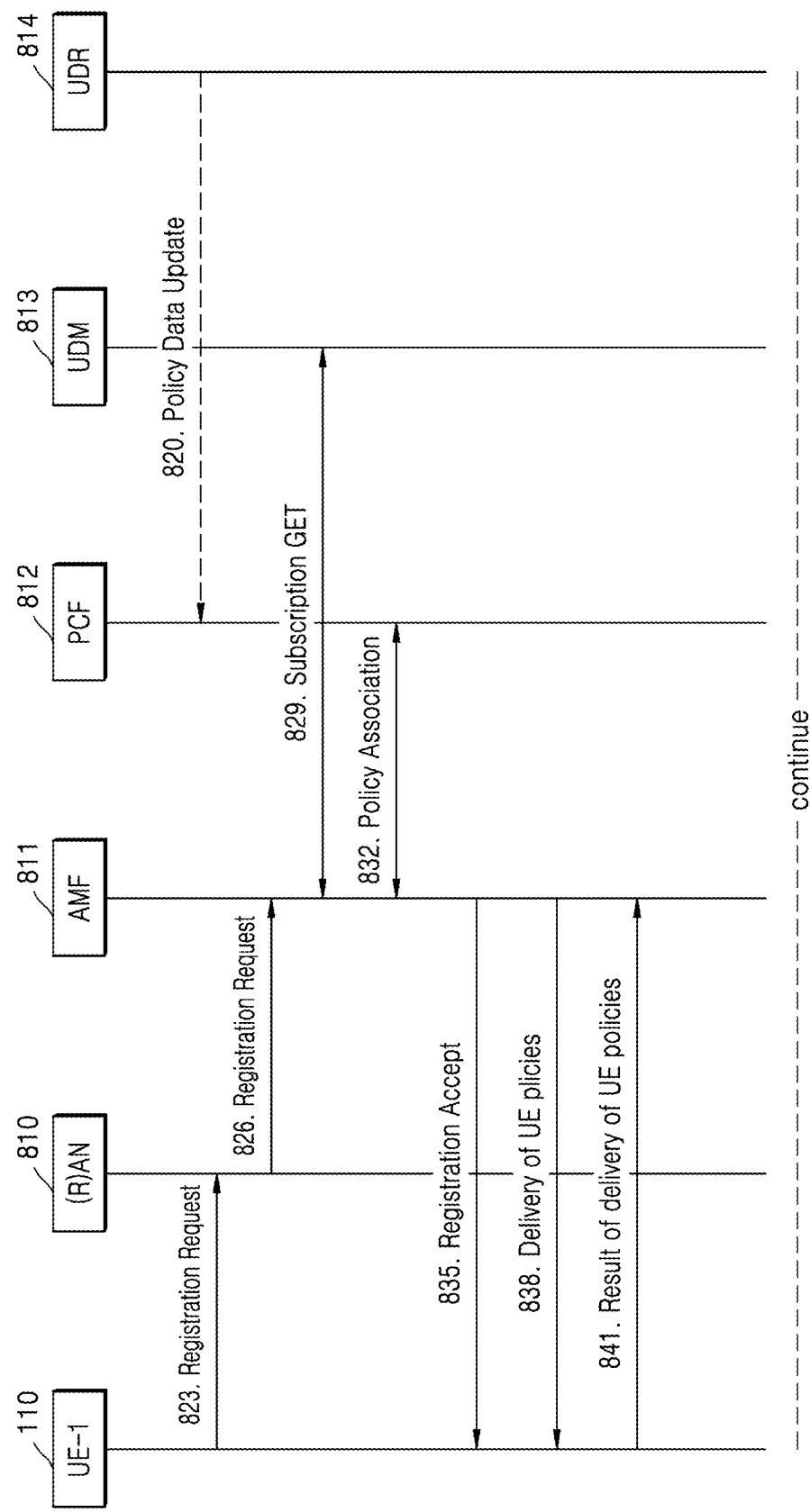
FIG. 8A illustrates an example of a procedure performed by a user equipment to acquire service information from a network in an initial registration process, according to certain embodiments of the disclosure.

Referring to the non-limiting example of FIG. 3, to perform a procedure for direct communication link establishment, user equipments 110, 115, 120, and 125 may acquire destination layer-2 ID (corresponding to 'The destination Layer-2 ID for PC5 unicast link establishment' of Table 1) information for link establishment from a network by using procedures shown in FIGS. 8A, 8B, and 8C, and store the destination layer-2 ID information. The destination layer-2 ID for link establishment may be set to different values according to application layers, applications that are supported by the application layers, or message types that are supported by the application layers. Alternatively, the destination layer-2 ID for link establishment may be set to a value regardless of application layers, applications that are supported by the application layers, or message types that are supported by the application layers.

Referring to the illustrative example of FIG. 3, the user equipment 115, 120, and 125 may determine a destination layer-2 ID (corresponding to 'The destination Layer-2 ID for PC5 unicast link establishment' of Table 1) for link establishment among stored V2X service policy parameters (information shown in Table 1) to receive an establishment signaling message of a direct communication link. When the user equipment 115, 120, and 125 receive an establishment signaling message for a direct communication link having the destination layer-2 ID for link establishment as a destination, the user equipment 115, 120, and 125 may process the establishment signaling message, in operation 310. The establishment signaling message of the direct communication link may have an address of the destination layer-2 ID as a destination.

The application layer 270 of the user equipment 110 which wants to perform an application operation may provide at least one of an 'application message' (hereinafter, referred to as a 'message' and being interchangeable with 'service data', 'data' or 'application data') generated by the application layer 270, a 'message type' (being interchangeable with a 'service type') representing a type of the message, a 'communication mode' (for example, Broadcast, Groupcast, Unicast, etc.) representing a communication method of the message, an 'application layer ID' (application layer identifier) of the user equipment 110, an 'application layer ID' (application layer identifier) of the user equipment 120, or 'Quality of Service (QoS) requirements' to the SE layer 280, in operation 315. In vehicle communication, the message type may be PSID, ITS-AID, etc.

The SE layer 280 of the user equipment 110 may determine whether to perform a link establishment procedure, based on communication mode information received from the application layer 270, in operation 315. For example, when a communication mode received from the application layer 270 is PC5 unicast, the SE layer 280 may determine to perform a link establishment procedure, and perform the following operation, in operation 320.

The SE layer 280 of the user equipment 110 may assign a flow identifier (ID) (being interchangeable with a QoS Flow Identifier (QFI) or a PC5 Flow Identifier (PFI), and hereinafter, referred to as a PFI) for generating a unicast link. The PFI may be assigned as a unique value in the user equipment 110. The SE layer 280 may transform the QoS requirements received from the application layer 270 into PQI (PC5 5QI) information capable of being used in the AS layer. Also, the SE layer 280 may determine whether the PQI information is available based on the V2X service policy parameters (for example, 'The list of V2X services that are allowed to use a specific PQI(s)' of Table 1) information. For example, the V2X service policy parameters (for example, 'The list of V2X services that are allowed to use a specific PQI(s)' of Table 1) may include a list of V2X services that are allowed to use high QoS (PQI), and the V2X services included in the list of V2X services are allowed to use a high PQI value.

The SE layer 280 may generate a direct communication request message for unicast link establishment. The direct communication request message may include at least one of an 'application message', a 'message type', an 'application layer ID' of the user equipment 110, 'QoS requirements', a 'PQI', or a 'PFI'.

The SE layer 280 may itself assign a layer-2 ID of the user equipment 110, which is to be used for a PC5 unicast link to be generated, and set the layer-2 ID assigned by the user equipment 110 to a source layer-2 ID of the direct communication request message. The SE layer 280 may set a stored destination layer-2 ID address ('The destination Layer-2 ID for PC5 unicast link establishment' of Table 1) for link establishment to a destination layer-2 ID of the direct communication request message.

In various embodiments, SE layer 280 may generate a link profile (being interchangeable with a unicast link profile, a PC5 link profile, or a PC5 unicast link profile) for the PC5 unicast link to be established. The link profile may include at least one of an 'application layer ID' of the user equipment 110, an 'application layer ID' of the user equipment 120, a 'layer-2 ID' of the user equipment 110 assigned by the user equipment 110, 'QoS requirements', a 'PQI', or 'PFI' information, and may be identified as a PFI which is a unique value in the user equipment 110.

The SE layer 280 may transmit the direct communication request message, the source layer-2 ID (that is, the layer-2 ID of the user equipment 110 assigned by the SE layer 280) of the direct communication request message, the destination layer-2 ID (that is, the destination layer-2 ID address for link establishment stored in the user equipment 110) of the direct communication request message, and information (for example, the assigned PFI information) of the direct communication link to be established to the PDCP layer 230. The SE layer 280 may indicate, to the PDCP layer 230, that a communication mode of the direct communication request message is PC5 broadcast. The user equipment 110 may transmit, by using a broadcast scheme, the direct communication request message via the PDCP layer 230, the RLC layer 240, the MAC layer 250, and the PHY layer 260, in operation 325.

The user equipments 115, 120, and 125 located in a vicinity of the user equipment 110 may receive the direct communication request message transmitted from the user equipment 110, in operation 325. Each of the user equipments 115, 120, and 125 may transfer the direct communication request message to a SE layer via a PHY layer, a MAC layer, a RLC layer, and a PDCP layer of each of the user equipments 115, 120, and 125. The SE layer may receive the direct communication request message, check a destination address of the direct communication request message, and determine a processing method of the direct communication request message. When the destination address of the direct communication request message is the destination layer-2 ID address (see operation 310) for link establishment stored in the corresponding user equipment, the SE layer may select an application layer to which the direct communication request message is to be transferred, based on at least one of the destination layer-2 ID address of the direct communication request message, the 'message type' included in the direct communication request message, or the 'application layer ID' information of the user equipment included in the direct communication request message, and transfer the direct communication request message to the selected application layer.

When the application layer 275 of the user equipment 120 receives the direct communication request message, the application layer 275 may determine to respond to the direct communication request message, based on the 'application message', the 'message type', the 'application layer ID' of the user equipment 110, the 'application layer ID' of the user equipment 120, etc., included in the direct communication request message. When the application layer 275 of the user equipment 120 determines to approve the direct communication request, the application layer 275 may provide at least one of an 'application message' (hereinafter, referred to as a 'message') generated by the application layer 275, a 'message type' representing a type of the message, a 'communication mode' (for example, broadcast, groupcast, unicast, etc.) representing a communication method of the message, an 'application layer ID' of the user equipment 110, an 'application layer ID' of the user equipment 120, or 'QoS requirements' to the SE layer 285, in operation 330.

The SE layer 285 of the user equipment 120 may determine to perform a link establishment procedure, and perform the following operation, in operation 335.

The SE layer 285 of the user equipment 120 may assign a PFI for generating a unicast link, or use the PFI received in operation 325. The PFI may be assigned as a unique value in the user equipment 110. The SE layer 285 may transform the QoS requirements received from the application layer 275 into PQI (PC5 5QI) information capable of being used in an AS layer.

The SE layer 285 of the user equipment 120 may generate a direct communication response message for unicast link establishment. The direct communication response message may include at least one of an 'application message', a 'message type', an 'application layer ID' of the user equipment 110, an 'application layer ID' of the user equipment 120, 'QoS requirements', a 'PQI', or a 'PFI'.

The SE layer 285 of the user equipment 120 may itself assign a layer-2 ID of the user equipment 120 to be used for a PC5 unicast link to be generated, and set the layer-2 ID assigned by the user equipment 120 to a source layer-2 ID of the direct communication response message. The SE layer 285 may set the source layer-2 ID of the direct communication request message received in operation 325 to a destination layer-2 ID of the direct communication response message.

The SE layer 285 of the user equipment 120 may generate a link profile (also, being interchangeable with a unicast link profile, a PC5 link profile, or a PC5 unicast link profile) for the PC5 unicast link to be established. The link profile may include at least one of the 'application layer ID' and 'layer-2 ID' (that is, the source layer-2 ID of the direct communication request message received in operation 325) of the user equipment 110, the 'application layer ID' and 'layer-2 ID' (assigned by the user equipment 120) of the user equipment 120, 'QoS requirements', a 'PQI', or 'PFI' information, and the link profile may be identified as a PFI which is a unique value in the user equipment 120.

The SE layer 285 may transmit the direct communication response message, the source layer-2 ID (that is, the layer-2 ID of the user equipment 120 assigned by the SE layer 285) of the direct communication response message, the destination layer-2 ID (that is, the source layer-2 ID of the direct communication request message received in operation 325) of the direct communication response message, and information (for example, information about the assigned PFI) about the direct communication link to be established to the PDCP layer 235 or the RRC layer 225. At this time, the SE layer 285 may indicate the PDCP layer 235 or the RRC layer 225 to configure a communication mode of the direct communication response message to PC5 unicast, and a message type to signaling. When the SE layer 285 transmits the direct communication response message through the RRC layer 225, the direct communication response message may be included in a RRC message and transmitted to the user equipment 110. The MAC layer 255 of the user equipment 120 may configure a logical channel ID (LCID) of a MAC header for transmitting the direct communication response message with a value representing a signaling message. The direct communication response message may be transmitted to the user equipment 110 via the PHY layer 265, in operation 340.

In various embodiments according to this disclosure, the SE layer 280 of the user equipment 110 receives the direct communication response message, the SE layer 280 may notify the application layer 270 that a direct communication link has been established. At this time, the SE layer 280 of the user equipment 110 may notify the application layer 270 of information (for example, a PFI, etc.) related to the direct communication link, together. Also, the SE layer 280 may notify the PDCP layer 230 or the RRC layer 220 of the information (for example, information about the assigned PFI) related to the direct communication link that has been completely established. The SE layer 280 may update the link profile generated in operation 320, based on the direct communication response message. For example, the SE layer 280 may store the destination layer-2 ID of the direct communication response message received in operation 340 as a 'layer-2 ID' of the user equipment 120. Also, when the 'application layer ID' of the user equipment 120, the 'QoS requirements', the 'PQI', and the 'PFI' information included in the direct communication response message received in operation 340 do not match with the link profile generated in operation 320, the SE layer 280 may update the link profile to information received in operation 340.

Figure 4:
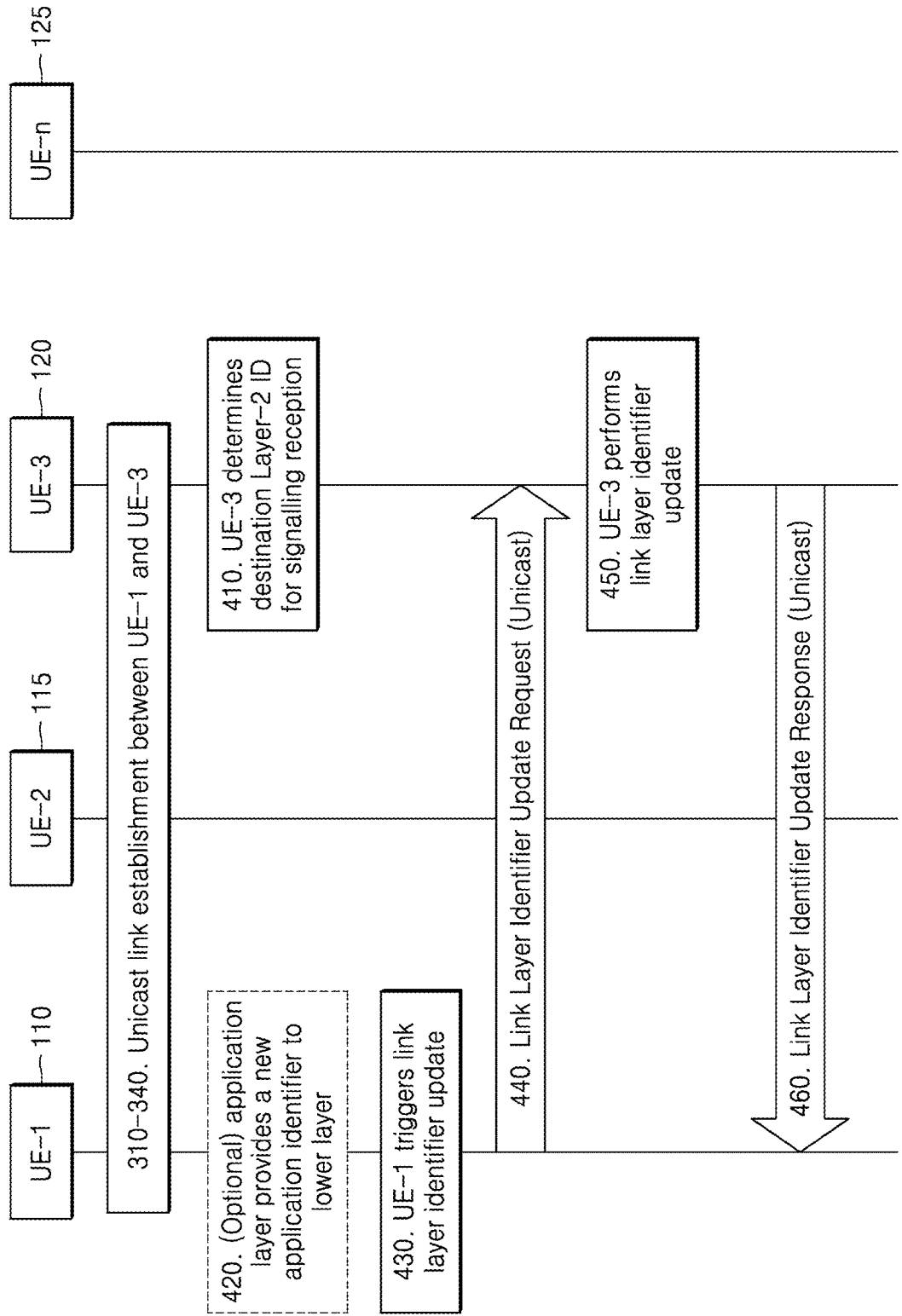
FIG. 4 illustrates an example of a procedure of changing a user equipment identifier, according to certain embodiments of the disclosure.

FIG. 4 illustrates an example of a procedure of changing a user equipment identifier, according to certain embodiments of the disclosure. More specifically, FIG. 4 illustrates, without limitation, a procedure of changing a layer-2 ID, according to certain embodiments of the disclosure.

Referring to the non-limiting example of FIG. 4, the user equipment 110 and the user equipment 120 may complete direct communication link establishment through the above-described procedure for direct communication link establishment. The user equipments 110 and 120 may generate a link profile during a process of direct communication link establishment, and store layer-2 ID information of the user equipments 110 and 120, which is to be used for a direct communication link.

The user equipment 120 may determine a layer-2 ID address of the user equipment 120 among stored link profile information to receive a direct communication link maintenance signaling message, in operation 410. The direct communication link maintenance signaling message may have, as a destination, the layer-2 ID address of the user equipment 120 determined in operation 410.

In some embodiments, application layer 270 of the user equipment 110 may change a currently used application layer ID of the user equipment 110. The application layer 270 may transfer the changed application layer ID and direct communication link information (for example, a service type (e.g., PSID or ITS-AIDs), a PFI, etc.) in which the application layer ID is used to the SE layer 280, in operation 420.

When the SE layer 280 receives the changed application layer ID from the application layer in operation 420 or when a service type being currently used by the user equipment 110 based on a policy/parameter stored in the user equipment 110 requests a privacy support, the SE layer 280 may determine to perform a procedure of changing the layer-2 ID at regular time intervals, and perform the following operation, in operation 430.

The SE layer 280 of the user equipment 110 may itself assign a new layer-2 ID of the user equipment 110, which is to be newly used in the direct communication link associated with the PFI. The SE layer 280 may store the new layer-2 ID of the user equipment 110 in a link profile associated with the PFI. When the SE layer 280 receives a newly assigned application layer ID from the application layer 270 in operation 420, the SE layer 280 may store the newly assigned application layer ID of the user equipment 110 in the link profile associated with the PFI.

In some embodiments, the SE layer 280 may generate a link layer identifier update request message for changing the layer-2 ID. The link layer identifier update request message may include at least one of the newly assigned layer-2 ID of the user equipment 110, the newly assigned application layer ID (when the SE layer 280 receives the newly assigned application layer ID from the application layer 270 in operation 420) of the user equipment 110, the layer-2 ID previously used by the user equipment 110, the application layer ID previously used or being currently used by the user equipment 110, or the 'PFI' representing the corresponding direct communication link.

The SE layer 280 of the user equipment 110 may set a source layer-2 ID of the link layer identifier update request message to the previously used layer-2 ID of the user equipment 110 or the newly assigned layer-2 ID of the user equipment 110. Also, the SE layer 280 of the user equipment 110 may set a destination layer-2 ID of the link layer identifier update request message to the layer-2 ID of the user equipment 120, stored in the link profile associated with the PFI.

The SE layer 280 may transmit the link layer identifier update request message, the source layer-2 ID of the link layer identifier update request message, the destination layer-2 ID of the link layer identifier update request message, and PFI information related to the link layer identifier update request message to the RRC layer 220. At this time, the SE layer 280 may indicate PC5 unicast as a communication mode of the link layer identifier update request message and signaling as a message type to the RRC layer 220. The link layer identifier update request message may be included in a RRC message and transmitted to the user equipment 120. The MAC layer 250 of the user equipment 110 may set a logical channel ID of the MAC header for transmitting the link layer identifier update request message to a value representing a signaling message. A value of a logical channel ID used in a signaling message may be different from that of a logical channel ID used in a data message. The link layer identifier update request message may be transmitted to the user equipment 120 via the PHY layer 260, in operation 440.

When the MAC layer 255 of the user equipment 120 receives the link layer identifier update request message, the MAC layer 255 may check the logical channel ID of the MAC header of the link layer identifier update request message to determine that the link layer identifier update request message is a signaling message, and transfer the link layer identifier update request message to the SE layer 285 via the RRC layer 225. The SE layer 285 may check the destination layer-2 ID and/or the PFI information of the link layer identifier update request message to determine that the link layer identifier update request message is a message for the direct communication link generated by the above-described procedure. Also, the SE layer 285 of the user equipment 120 may determine that the received link layer identifier update request message is a signaling message depending on whether the link layer identifier update request message is received from the RRC layer 225, and perform the following operation, in operation 450.

The SE layer 285 may update link profile information based on information of the received link layer identifier update request message. For example, the SE layer 285 of the user equipment 120 may check the PFI included in the link layer identifier update request message, and store the newly assigned layer-2 ID of the user equipment 110, included in the link layer identifier update request message, in a link profile associated with the PFI and stored in the user equipment 120. When the newly assigned application layer ID is included in the link layer identifier update request message, the SE layer 285 may store the newly assigned application layer ID of the user equipment 110, included in the link layer identifier update request message, in the link profile associated with the PFI, and then notify the application layer 275 that the application layer ID of the user equipment 110 for direct communication link establishment has changed. At this time, the SE layer 285 of the user equipment 120 may notify the application layer 275 of information (for example, PFI, etc.) related to the direct communication link, together.

In various embodiments according to this disclosure, SE layer 285 of the user equipment 120 may generate a link layer identifier update response message. The link layer identifier update response message may include at least one of information notifying that the user equipment 120 has received the link layer identifier update request message and will use the newly assigned layer-2 ID and/or the newly assigned application layer ID of the user equipment 110 for subsequent direct communication, or the PFI used in the corresponding direct communication link.

When the user equipment 120 determines to change an ID that the user equipment 120 uses, the SE layer 285 may itself assign a new layer-2 ID of the user equipment 120, and include the new layer-2 ID of the user equipment 120 in the link layer identifier update response message. Also, when the SE layer 285 receives a new application layer ID from the application layer 275, the SE layer 285 may include the new application layer ID of the user equipment 120 in the link layer identifier update response message. The SE layer 285 may store the new layer-2 ID and/or the new application layer ID of the user equipment 120 in the link profile associated with the PFI.

The SE layer 285 of the user equipment 120 may set a source layer-2 ID of the link layer identifier update response message to the currently used new layer-2 ID of the user equipment 120, stored in the link profile associated with the PFI. Also, the SE layer 285 of the user equipment 120 may set a destination layer-2 ID of the link layer identifier update response message to the currently used new layer-2 ID of the user equipment 110, stored in the link profile associated with the PFI.

The SE layer 285 may transmit the link layer identifier update response message, the source layer-2 ID of the link layer identifier update response message, the destination layer-2 ID of the link layer identifier update response message, and PFI information associated with the link layer identifier update response message to the RRC layer 225. At this time, the SE layer 285 may indicate the RRC layer 225 to configure a communication mode of the link layer identifier update response message to PC5 unicast, and a message type to signaling. The link layer identifier update response message may be included in a RRC message and transmitted to the user equipment 110. The MMC layer 255 of the user equipment 120 may set a logical channel ID of the MAC header for transmitting the link layer identifier update response message to a value representing a signaling message. A value of a logical channel ID used in a signaling message may be different from that of a logical channel ID used in a data message. The link layer identifier update response message may be transmitted to the user equipment 110 via the PHY layer 265, in operation 460.

The user equipment 120 may use the new IDs (the new layer-2 ID and/or the new application layer ID of the user equipment 110 and the new layer-2 ID and/or the new application layer ID of the user equipment 120) of the user equipments 110 and 120 for subsequent direct communication (signaling and message transmission) associated with the PFI.

When the MAC layer 250 of the user equipment 110 receives the link layer identifier update response message, the MAC layer 250 of the user equipment 110 may check the logical channel ID of the MAC header of the link layer identifier update response message to determine that the received link layer identifier update response message is a signaling message, and transfer the link layer identifier update response message to the SE layer 280 via the RRC layer 220. The SE layer 280 may determine whether the link layer identifier update response message is a message for the direct communication link generated by the above-described procedure, based on the destination layer-2 ID of the received link layer identifier update response message and/or the PFI information. Also, the SE layer 280 of the user equipment 110 may determine that the received link layer identifier update response message is a signaling message, depending on whether the link layer identifier update response message is received from the RRC layer 220. The SE layer 280 may use the new IDs (for example, the new layer-2 ID and/or the new application layer ID of the user equipment 110 and the new layer-2 ID and/or the new application layer ID of the user equipment 120) of the user equipments 110 and 120 for signaling and message transmission for direct communication associated with the PFI. When the user equipment 120 includes new ID information (for example, the new layer-2 ID and/or the new application layer ID of the user equipment 120) in the link layer identifier update response message, the SE layer 280 may store the new ID information of the user equipment 120 in the link profile associated with the PFI.

The user equipments 110 and 120 may update a QoS parameter (for example, PQI) that is used for direct communication associated with the PFI by a method that is similar to the procedure shown in FIG. 4. To update the QoS parameter, the link layer identifier update request message or the link layer identifier update response message may be used as a signaling message. Another signaling message (for example, a QoS parameter update request message or a QoS parameter update response message) or a signaling message (for example, a Prose Link Update request/response message) capable of being used for both ID updating and QoS parameter updating of a user equipment may be used as a signaling message.

Figure 5:
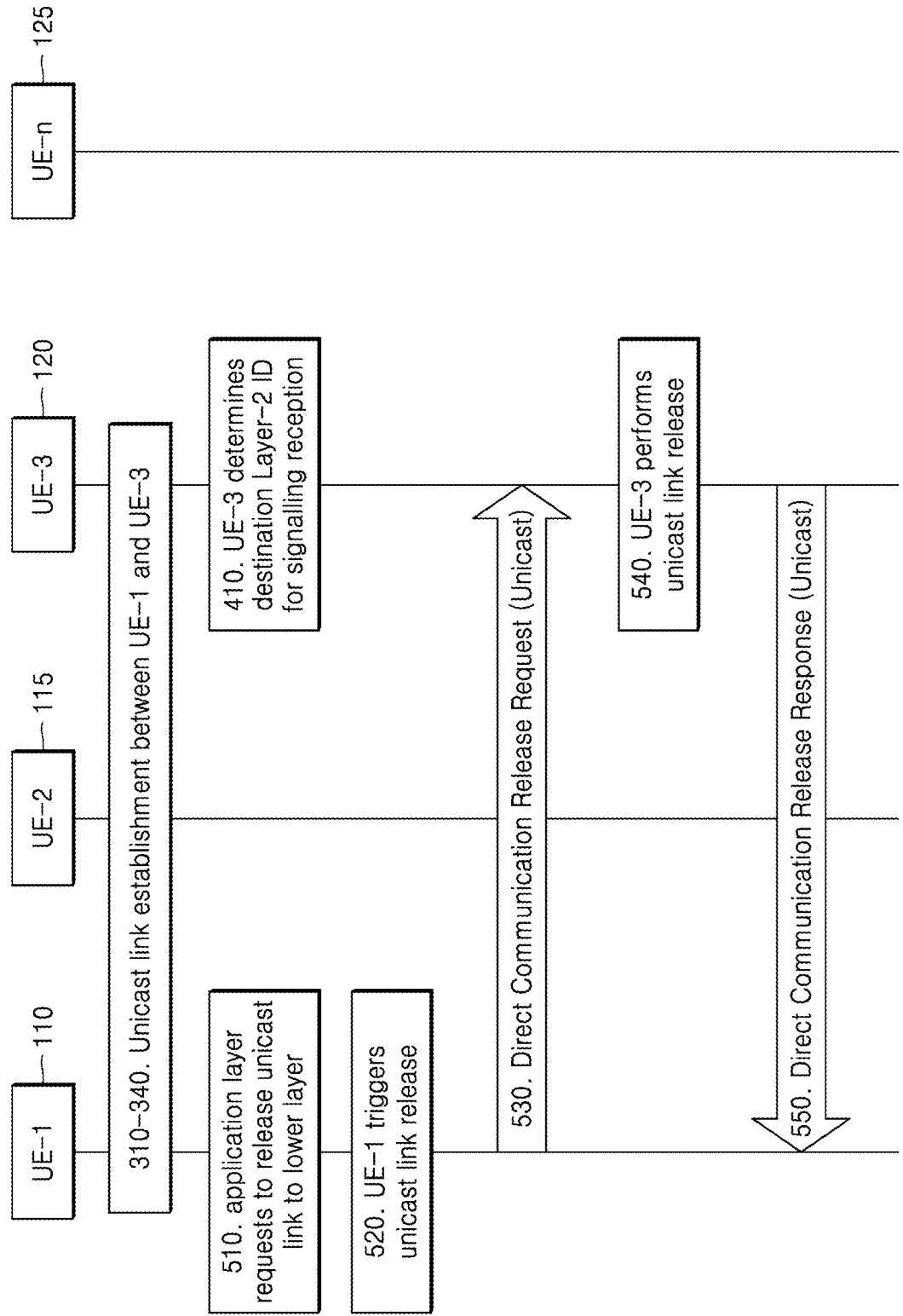
FIG. 5 illustrates an example of a procedure of releasing a direct communication link, according to certain embodiments of the disclosure.

FIG. 5 illustrates an example of a procedure of releasing a direct communication link, according to certain embodiments of the disclosure.

Referring to the non-limiting example of FIG. 5, the user equipment 110 and the user equipment 120 may complete direct communication link establishment through the above-described procedure. The user equipments 110 and 120 may generate a link profile during a process of direct communication link establishment, and store layer-2 ID information of the user equipments 110 and 120, which is to be used for the direct communication link.

The user equipment 120 may determine a layer-2 ID address of the user equipment 120 from among stored link profile information to receive a direct communication link maintenance signaling message, in operation 410. The direct communication link maintenance signaling message may have, as a destination, the layer-2 ID address of the user equipment 120 determined in operation 410.

The application layer 270 of the user equipment 110 may make a request to release a direct communication link associated with a PFI, in operation 510.

The SE layer 280 of the user equipment 110 may perform the following operation to release the direct communication link, in operation 520.

The SE layer 280 may generate a direct communication release request message. The SE layer 280 of the user equipment 110 may set a source layer-2 ID of the direct communication release request message to the currently used layer-2 ID of the user equipment 110, stored in a link profile associated with the PFI. Also, the SE layer 280 may set a destination layer-2 ID of the direct communication release request message to the currently used layer-2 ID of the user equipment 120, stored in the link profile associated with the PFI.

The SE layer 280 may transmit the direct communication release request message, the source layer-2 ID of the direct communication release request message, the destination layer-2 ID of the direct communication release request message, and PFI information associated with the direct communication release request message to the RRC layer 220. At this time, the SE layer 280 may indicate the RRC layer 220 to configure a communication mode of the direct communication release request message to PC5 unicast, and a message type to signaling. The direct communication release request message may be included in a RRC message and transmitted to the user equipment 120. The MAC layer 250 of the user equipment 110 may set a logical channel ID of a MAC header for transmitting the direct communication release request message to a value representing a signaling message. A value of a logical channel ID used in a signaling message may be different from that of a logical channel ID used in a data message. The direct communication release request message may be transmitted to the user equipment 120 via the PHY layer 260, in operation 530.

In various embodiments, when the MAC layer 255 of the user equipment 120 receives the direct communication release request message, the MAC layer 255 may determine whether the direct communication release request message is a signaling message, based on the logical channel ID of the MAC header of the direct communication release request message, and transfer the direct communication release request message to the SE layer 285 via the RRC layer 225. The SE layer 285 may determine whether the direct communication release request message is a message for a direct communication link, based on the destination layer-2 ID of the direct communication release request message and/or the PFI information. Also, the SE layer 285 of the user equipment 120 may determine that the direct communication release request message is a signaling message, depending on whether the direct communication release request message is received from the RRC layer 225, and perform the following operation, in operation 540.

The SE layer 285 may notify the application layer 275 that the direct communication link associated with the PFI has been released. The SE layer 285 may generate a direct communication release response message. The SE layer 285 of the user equipment 120 may set a source layer-2 ID of the direct communication release response message to the currently used layer-2 ID of the user equipment 120, stored in a link profile associated with the PFI. Also, the SE layer 285 may set a destination layer-2 ID of the direct communication release response message to the currently used layer-2 ID of the user equipment 110, stored in the link profile associated with the PFI.

In various embodiments, the SE layer 285 may transmit the direct communication release response message, the source layer-2 ID of the direct communication release response message, the destination layer-2 ID of the direct communication release response message, and PFI information associated with the direct communication release response message to the RRC layer 225. At this time, the SE layer 285 may indicate the RRC layer 225 to configure a communication mode of the direct communication release response message to PC5 unicast, and a message type to signaling. The direct communication release response message may be included in a RRC message and transmitted to the user equipment 110. The MAC layer 255 of the user equipment 120 may set a logical channel ID of a MAC header for transmitting the direct communication release response message to a value representing a signaling message. A value of a logical channel ID used in a signaling message may be different from that of a logical channel ID used in a data message. The direct communication release response message may be transmitted to the user equipment 110 via the PHY layer 265, in operation 550.

The SE layer 285 may delete the link profile information associated with the PFI.

When the MAC layer 250 of the user equipment 110 receives the direct communication release response message, the MAC layer 250 may determine whether the direct communication release response message is a signaling message, based on the logical channel ID of the MAC header of the direct communication release response message, and transfer the direct communication release response message to the SE layer 280 via the RRC layer 220. The SE layer 280 may determine whether the direct communication release response message is a message for the direct communication link generated by the above-described procedure, based on the destination layer-2 ID of the direct communication release response message and/or the PFI information. Also, the SE layer 280 of the user equipment 110 may determine that the direct communication release response message is a signaling message, depending on whether the direct communication release response message is received from the RRC layer 220. The SE layer 280 may notify the application layer 270 that the direct communication link associated with the PFI has been released. The SE layer 280 may delete the link profile information associated with the PFI.

Figure 6:
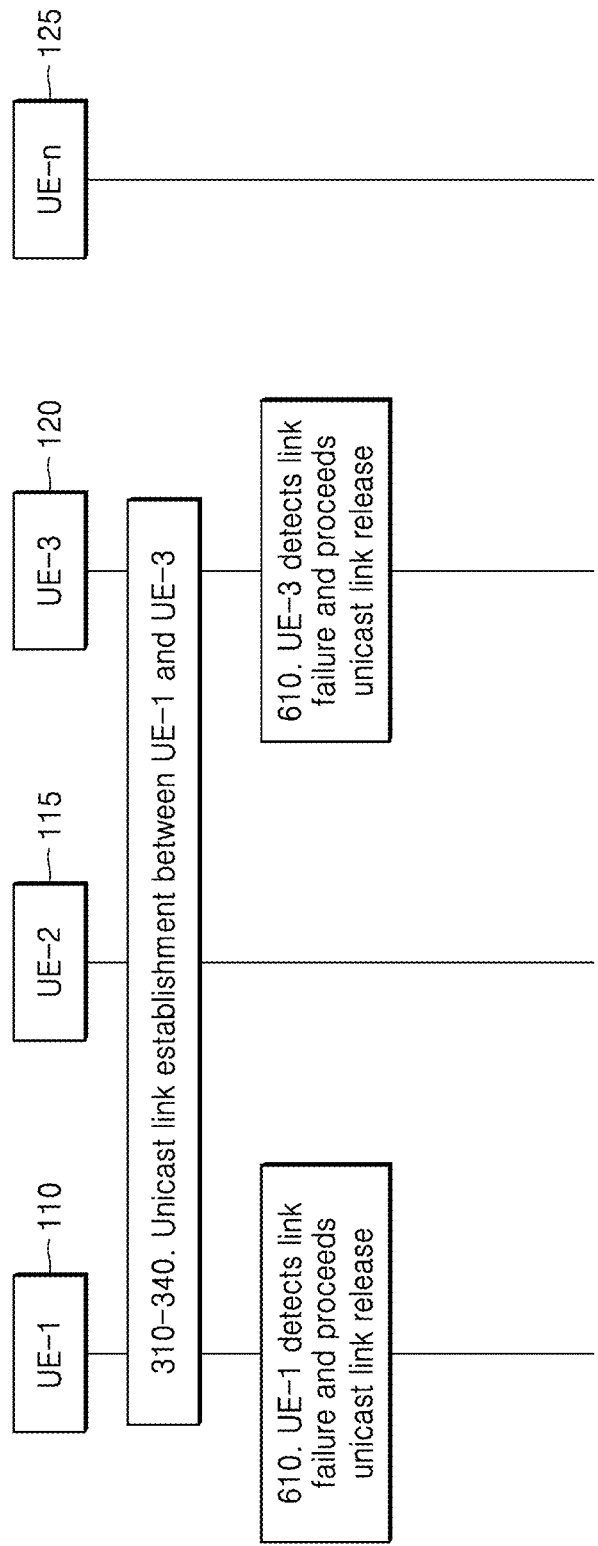
FIG. 6 illustrates an example of a procedure of releasing a direct communication link, according to another embodiment of the disclosure.

FIG. 6 illustrates an example of a procedure of releasing a direct communication link, according to various embodiments of the disclosure.

Referring to the non-limiting example of FIG. 6, the user equipment 110 and the user equipment 120 may complete direct communication link establishment through the above-described procedure. The user equipments 110 and 120 may generate a link profile during a process of direct communication link establishment, and store layer-2 ID information of the user equipments 110 and 120, which is to be used for a direct communication link.

The SE layers 280 and 285 of the user equipments 110 and 120 may check current state information of a direct communication link associated with a PFI by the following method, in operation 610.

First, the SE layers 280 and 285 may receive a report about the current state information of the direct communication link associated with the PFI from the RRC layers 220 and 225, the PDCP layers 230 and 235, the RLC layers 240 and 245, or the MAC layers 250 and 255. When the received report about the current state information represents a link failure, the SE layers 280 and 285 may determine that a communication through the direct communication link established between the user equipments 120 and 110 is currently impossible.

Alternatively, the SE layers 280 and 285 may use a Keep-alive function. When there is no response to a Keep-alive request message from the user equipments 120 and 110 for a preset time period, the SE layers 280 and 285 may determine that a communication through the direct communication link established between the user equipments 120 and 110 is currently impossible.

When the SE layers 280 and 285 may determine that a communication through the direct communication link associated with the PFI is currently impossible, by the above-described methods, the SE layers 280 and 285 may notify the application layers 270 and 275 that the direct communication link associated with the PFI has been released. Then, the SE layers 280 and 285 may delete the link profile information associated with the PFI.

Figure 7:
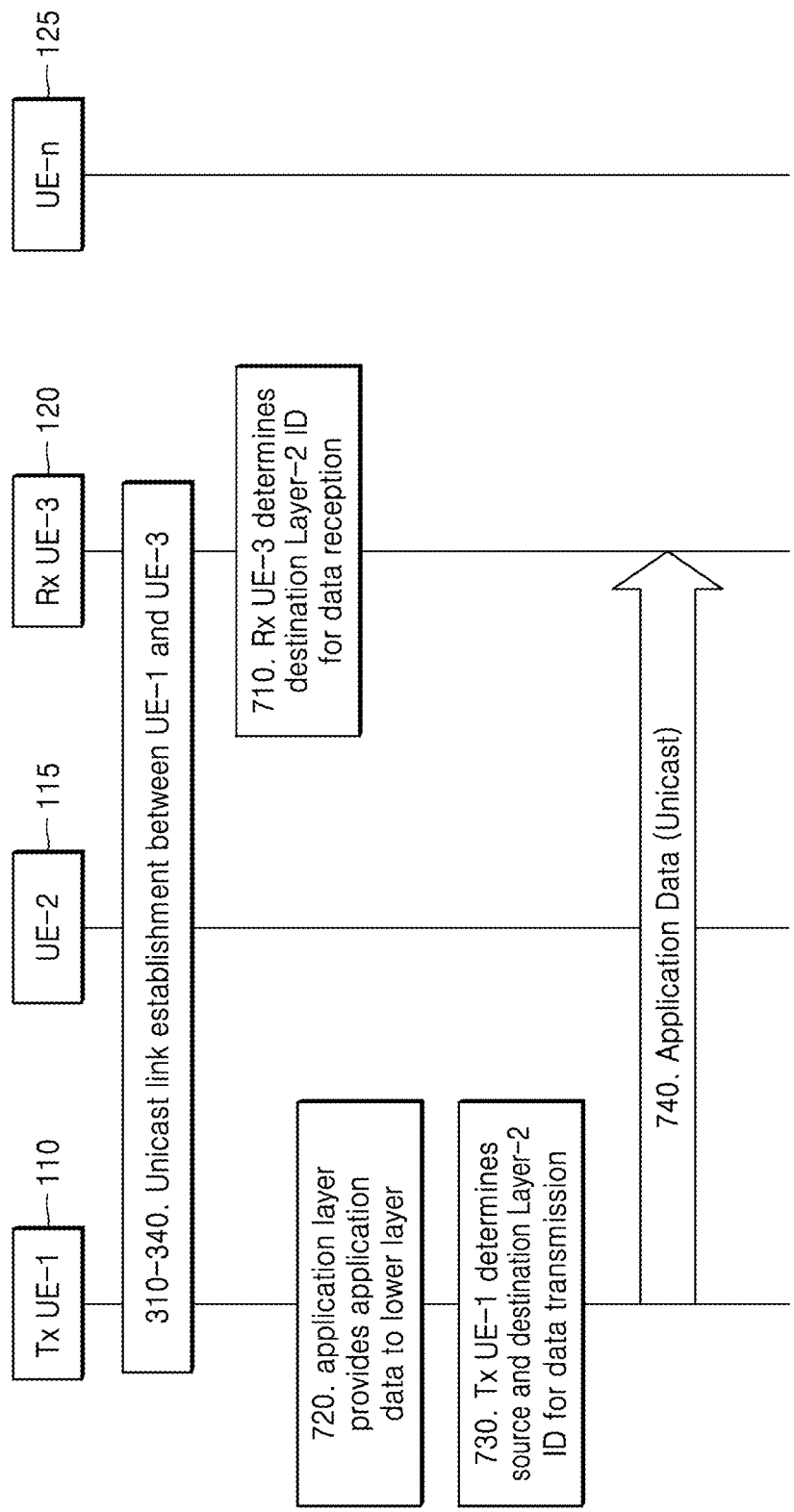
FIG. 7 illustrates an example of a data transmission procedure using a direct communication link, according to certain embodiments of the disclosure.

FIG. 7 illustrates an example of a data transmission procedure using a direct communication link, according to certain embodiments of the disclosure.

Referring to the non-limiting example of FIG. 7, the user equipment 110 and the user equipment 120 may complete direct communication link establishment through the above-described procedure. The user equipments 110 and 120 may generate a link profile during a process of direct communication link establishment, and store layer-2 ID information of the user equipments 110 and 120, which is to be used for the direct communication link.

In various embodiments, the user equipment 120 may determine a layer-2 ID address of the user equipment 120 from among link profile information to receive data on a stored direct communication link, in operation 710. A data message that is transmitted on the direct communication link may have, as a destination, the layer-2 ID address of the user equipment 120 determined in operation 710.

The application layer 270 of the user equipment 110 may transmit at least one of an 'application message' generated by the application layer 270, a 'PFI' representing a direct communication link on which the message is transmitted, a 'message type' representing a type of the message, a 'communication mode' (for example, Broadcast, Groupcast, Unicast, etc.) representing a communication method of the message, an 'application layer ID' of the user equipment 110, an 'application layer ID' of the user equipment 120, or 'QoS requirements', to the SE layer 280, in operation 720.

In certain embodiments, the SE layer 280 may check link profile information associated with the PFI, received in operation 720. To transmit 'application data' received in operation 720, the SE layer 280 may set a source layer-2 ID to the currently used layer-2 ID of the user equipment 110, stored in the link profile associated with the PFI, and set a destination layer-2 ID to the currently used layer-2 ID of the user equipment 120, stored in the link profile associated with the PFI, in operation 730.

The SE layer 280 may transmit at least one of the 'application data', the 'source layer-2 ID' determined in operation 730, the 'destination layer-2 ID' determined in operation 730, or associated 'PFI' information to the SDAP layer 290. The SDAP layer 290 of the user equipment 110 may transmit a message by using the received information associated with the PFI. The MAC layer 250 may set a logical channel ID of a MAC header for transmitting the message to a value representing a data message. A value of a logical channel ID used in a data message may be different from that of a logical channel ID used in a signaling message. The 'application data' may be transmitted to the user equipment 120 via the PHY layer 260, in operation 740.

When the MAC layer 255 of the user equipment 120 receives the 'application data', the MAC layer 255 may determine that the received message is a data message, based on the logical channel ID of the MAC header of the received message, and transfer the message to the SE layer 285 via the SDAP layer 295. The SE layer 285 may determine whether the received message is a message for the direct communication link generated by the above-described procedure, based on the destination layer-2 ID of the received message and/or the PFI information. Also, the SE layer 285 of the user equipment 120 may determine that the received message is a data message, depending on whether the message is received from the SDAP layer 295.

According to various embodiments, the SE layer 285 may transfer the received 'application data' to the application layer 275. Also, the SE layer 285 may transfer direct communication link information (for example, PFI, PSID, ITS-AIDs, application layer IDs of the user equipments 110 and 120, etc.) associated with the 'application data' to the application layer 275.

FIG. 8A illustrates an example of a procedure performed by user equipment to acquire service information from a network in an initial registration process, according to certain embodiments of the disclosure.

Referring to the non-limiting example of FIG. 8A, when AMF 811 receives a registration request message from the user equipment 110 through (R)AN 810 in operations 823 and 826, the AMF 811 may request UDM 813 to transmit UE subscription information and acquire UE subscription information from the UDM 813, in operation 829. Also, the AMF 811 may request PCF 812 to transmit policy information associated with the user equipment 110, in operation 832.

At this time, the user equipment 110 may include information about functions supported by the user equipment 110 and/or information about a UE policy container (for example, V2X policy) in the registration request message, and transmit the resultant registration request message to the (R)AN 810, in operation 823. The (R)AN 810 may transfer the registration request message received from the user equipment 110 to the AMF 811, in operation 826. When the user equipment 110 supports a V2X service, information representing that the user equipment 110 supports the V2X service may be included in UE capability information and provided to the AMF 811. Also, information representing that the user equipment 110 supports PC5 communication may be included in UE LTE PC5 capability information and UE NR PC5 capability information and provided to the AMF 811.

According to certain embodiments, the AMF 811 may request the UDM 813 to transmit UE subscription information, in operation 829. In operation 829, the UDM 813 may transmit a UE subscription information request message to UDR 814. The UE subscription information request message may include information (for example, SUPI, 5G-GUTI, IMSI, etc. of the user equipment 110) representing the user equipment 110. The UDR 814 may transmit a DM Query response message including the UE subscription information of the user equipment 110 to the UDM 813. When the UDM 813 receives the UE subscription information, the UDM 813 may transmit a UE subscription response message to the AMF 811. The UE subscription response message may include at least one of V2X service authentication information of the user equipment 110, V2X capability of the user equipment 110, PC5 LTE capability of the user equipment 110, PC5 NR capability of the user equipment 110, or information related to subscription of the user equipment 110.

When the AMF 811 determines that the user equipment 110 supports the V2X service, based on the UE capability information received from the user equipment 110, the AMF 811 may select PCF 812 that supports the V2X service. The AMF 811 may request the selected PCF 812 to transmit policy information related to the user equipment 110, in operation 832. In operation 832, a message may include the information about the UE policy container (V2X policy) received by the AMF 811 from the user equipment 110.

In some embodiments according to this disclosure, the PCF 812 may acquire a V2X service parameter that is to be applied to the user equipment 110 from the UDR 814, by various methods. First, when the V2X service parameter needs to be updated, the UDR 814 may provide a V2X service parameter to the PCF 812, in operation 820. Also, in operation 832, the PCF 812 may request the UDR 814 to transmit a V2X service parameter and acquire the V2X service parameter from the UDR 814.

The V2X service parameter provided from the UDR 814 to the PCF 812 may include service policy/parameter information described in the disclosure.

Meanwhile, the PCF 812 may receive subscriber information of the user equipment 110 and information about functions supported by the user equipment 110, in operation 832. The AMF 811 may provide the UE capability information and/or UE subscription information acquired from the UDM 807 to the PCF 812, in operation 832.

The PCF 812 may provide information about a policy that is to be applied to the user equipment 110 to the AMF 811, and the V2X service parameter received from the UDR 814 may be included in the information about the policy, in operation 832.

In certain embodiments, the AMF 811 may include the V2X service parameter received from the PCF 812 in a registration accept message, and transfer the resultant registration accept message to the user equipment 110, in operation 835. Alternatively, the AMF 811 may transfer the V2X service parameter received from the PCF 812 to the user equipment 110 through a preset procedure, in operation 838. The V2X service parameter, which is included in the registration accept message (operation 835) or in a UE policy transfer message (operation 838), may include at least one of the service policy/parameter information described in the disclosure.

FIG. 8B illustrates a procedure performed by a user equipment to acquire service information from a network in response to a request from the network, according to certain embodiments of the disclosure.

More specifically, FIG. 8B illustrates, without limitation, an example of a method performed by the user equipment 110 to acquire service policy/parameter information (for example, V2X service policy parameters shown in Table 1) according to certain embodiments. Referring to the non-limiting example of FIG. 8B, the user equipment 110 may acquire a UE policy by using a UE configuration update procedure.

Again, with reference to the explanatory example of FIG. 8B, the PCF 812 may determine to update a UE policy, in operation 843. The PCF 812 may have received and stored updated service policy/parameter information (for example, V2X service policy parameters shown in Table 1) of the user equipment 110 from the UDR 814, like operation 820 of FIG. 8A.

The PCF 812 may determine whether the UE policy needs to be updated, in an initial registration process of the user equipment 110 or when the network triggers updating the UE policy after initial registration of the user equipment 110, as shown in FIG. 8A. For example, in the initial registration process, the PCF 812 may determine whether the UE policy needs to be updated, based on UE policy container (for example, V2X policy) information received from the AMF 811 and policy information (for example, included in Npcf_UEPolicyControl_Create request) associated with an access selection and PDU selection of the user equipment 110. Alternatively, when an event occurs, for example, when a location of the user equipment 110 changes or when subscription information of the user equipment 110, for example, a slice service (subscribed S-NSSAI) which the user equipment 110 has subscribed changes, the PCF 812 may determine whether the UE policy needs to change. Also, the PCF 812 may determine to transfer the service policy/parameter information (for example, the V2X service policy parameters shown in Table 1) received from the UDR 814 to the user equipment 110, as described above in operation 832 of FIG. 8A.

In operation 845, the PCF 812 may transfer the service policy/parameter information (for example, the V2X service policy parameters shown in Table 1) to the AMF 811. When the V2X service policy parameters shown in Table 1 are transmitted as the service policy/parameter information, the service policy/parameter information may include at least one of the V2X service policy parameters shown in Table 1. The service policy/parameter information (for example, the V2X service policy parameters shown in Table 1) according to certain embodiments of the disclosure may be included in a Namf_Communication_N1N2MessageTransfer message and transmitted to the AMF 811, in operation 845. The Namf_Communication_N1N2MessageTransfer message may include SUPI, a UE policy container, etc.

In some embodiments, when the user equipment 110 has been registered in the network and is in a service receivable state, the AMF 811 may determine to transfer a UE policy received from the PCF 812 to the user equipment 110, in operation 848. When the user equipment 110 has been registered in any one of 3GPP and non-3GPP accesses, the AMF 811 may transfer the UE policy to the user equipment 110 through the access which the user equipment 110 has been registered in and is connected to. When the user equipment 110 has been registered in and is connectable to both 3GPP and non-3GPP accesses, the AMF 811 may select an access from among the 3GPP and non-3GPP accesses according to a local policy of the AMF 811 and transfer the UE policy to the user equipment 110 through the selected access. When the user equipment 110 has never been registered in or is disallowed to be connected to any one of 3GPP and non-3GPP accesses, the AMF 811 may notify the PCF 812 that transmission of the UE policy has failed (for example, through Namf_Communication_N1N2TransferFailureNotification), in operation 856. When the AMF 811 determines to transfer the UE policy to the user equipment 110 through the 3GPP access and the user equipment 110 is in a CM-IDLE state, the AMF 811 may transmit a paging request message to the user equipment 110 to start a paging procedure (network triggered service request). When the user equipment 110 receives the paging request message, the user equipment 110 may perform a paging procedure.

In operation 851, the AMF 811 may transfer the UE policy to the user equipment 110. When the UE policy includes a V2X service, the UE policy may include at least one of the V2X service policy parameters shown in Table 1.

When the user equipment 110 receives information about the UE policy, the user equipment 110 may store the information therein, and transmit a response message notifying that the information has been received to the AMF 811, in operation 853.

In certain embodiments, the AMF 811 may notify the PCF 812 that the service policy/parameter information (for example, the V2X service policy parameters shown in Table 1) has been transmitted to the user equipment 110, in operation 856. At this time, a Namf_N1MessageNotify message may be used. Then, the PCF 812 may maintain the UE policy, or notify the UDR 814 of an updated UE policy.

FIG. 8C illustrates an example of a procedure performed by a user equipment to acquire service information from a network in response to a request from the user equipment, according to certain embodiments of the disclosure.

More specifically, FIG. 8C illustrates an example of a method performed by the user equipment 110 to acquire service policy/parameter information (for example, the V2X service policy parameters shown in Table 1), according to various embodiments of this disclosure. In the non-limiting example of FIG. 8C, the user equipment 110 may trigger acquisition of a UE policy to acquire the UE policy.

Referring to the illustrative example of FIG. 8C, the user equipment 110 may transmit a message requesting a UE policy to the AMF 811, in operation 859. The message requesting the UE policy may be a UE policy provisioning request message, and the UE policy provisioning request message may include a UE policy container (for example, V2X policy).

Also, the AMF 811 may transmit a message requesting UE policy information to the PCF 812, in operation 862. The message requesting the UE policy information may be Npcf_UEPolicyControl_Update request, and the message may include the UE policy container (for example, the V2X policy) received from the user equipment 110.

When the PCF 812 receives the message requesting the UE policy information, the PCF 812 may determine whether the UE policy needs to be updated, in operation 843.

In some embodiments, operations 843, 845, 848, 851, 853, and 856 of FIG. 8C may be similar to the corresponding operations described above with reference to FIG. 8B.

For example, the PCF 812 may transmit information about a UE policy to the AMF 811, in operation 845, and the AMF 811 may determine to transfer the UE policy to the user equipment 110 and then transfer the UE policy to the user equipment 110, in operations 848 and 851. Also, the user equipment 110 may transmit a response message to the AMF 811 in response to reception of the UE policy, in operation 853, and the AMF 811 may transmit a message about whether transmission of the UE policy is successful to the PCF 812, in operation 856.

A procedure performed by the user equipment 110 to acquire a service parameter/policy from a network, as described above with reference to FIGS. 8A, 8B, and 8C, may be applied in the same way to other user equipment.

Figure 9A:
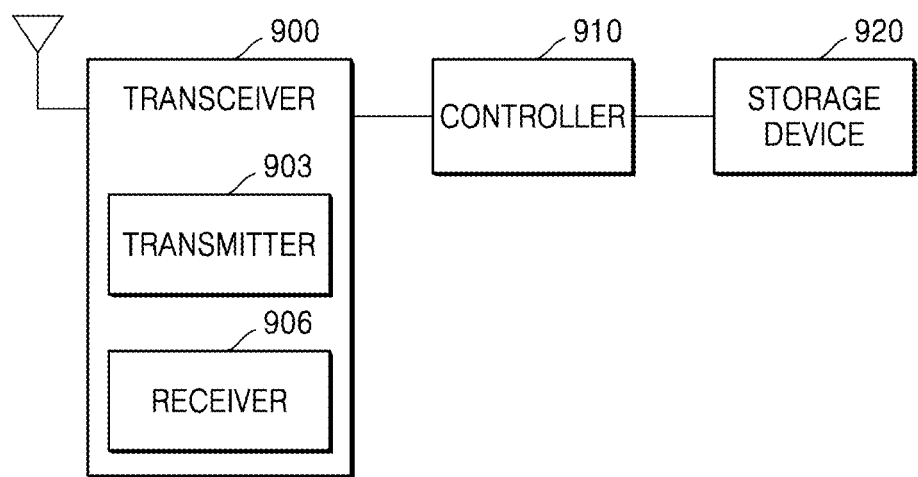
FIG. 9A illustrates, in block diagram format, an example of a configuration of a network entity according to certain embodiments of the disclosure.

FIG. 9A illustrates, in block diagram format, an example of a configuration of a network entity according to certain embodiments of the disclosure.

Referring to the non-limiting example of FIG. 9A, the network entity according to certain embodiments of the disclosure may include the (R)AN 810, the AMF 811, the PCF 812, the UDM 813, and the UDR 814. Also, the network entity may include eNB, MME, S-GW, P-GW, PCRF, and HSS.

Referring to the illustrative example of FIG. 9A, the network entity may be composed of a transceiver 900, a controller 910, and a storage device 920. The transceiver 900, the controller 910, and the storage device 920 of the network entity may operate according to a communication method of the network entity as described above. However, components of the network entity are not limited to the above-mentioned examples. For example, the network entity may include more or less components than the above-mentioned components. Also, the transceiver 900, the controller 910, and the storage device 920 may be implemented in a form of one chip. Also, the controller 910 may include at least one processor.

The transceiver 900 is a collective name for a receiver 906 of the network entity and a transmitter 903 of the network entity, and may transmit and receive signals. Signals that are transmitted and received may include control information and data. To transmit and receive signals, the transceiver 900 may be composed of an RF transmitter for up-converting a frequency of a signal to be transmitted and amplifying the signal, and an RF receiver for low-noise amplifying a received signal and down-converting a frequency of the received signal. However, the RF transmitter and RF receiver are certain embodiments of the transceiver 900, and components of the transceiver 900 are not limited to the RF transmitter and the RF receiver.

In some embodiments, the transceiver 900 may receive a signal through a wireless channel, output the signal to the controller 910, and transmit a signal output from the controller 910 through the wireless channel.

The storage device 920 may store programs and data required for operations of the network entity. Also, the storage device 920 may store control information or data included in signals acquired by the network entity. The controller 910 may be configured with storage media, such as read only memory (ROM), random access memory (RAM), a hard disc, compact disc-read only memory (CD-ROM), and a digital versatile disc (DVD), or a combination of the storage media.

The controller 910 may control a series of processes such that the network entity operates according to the above-described embodiments of the disclosure. For example, the controller 910 may receive a control signal and a data signal through the transceiver 900, and process the received control signal and data signal. Also, the controller 910 may transmit the processed control signal and data signal through the transceiver 900.

Figure 9B:
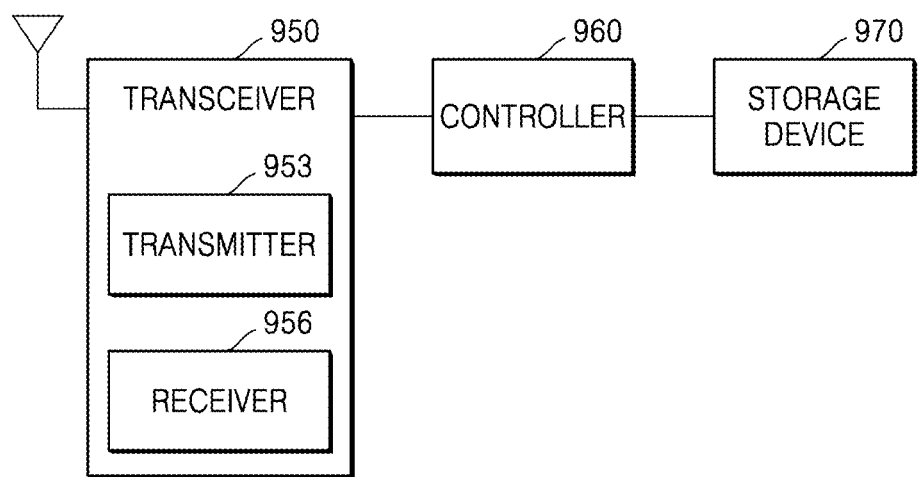
FIG. 9B illustrates, in block diagram format, an example of a configuration of a user equipment according to certain embodiments of the disclosure.

FIG. 9B illustrates, in block diagram format, an example of a configuration of a user equipment according to certain embodiments of the disclosure.

More specifically, FIG. 9B illustrates an example of an internal structure of the user equipment 110 and 120 according to certain embodiments of the disclosure. The user equipment may include a transceiver 950, a controller 960, and a storage device 970.

The transceiver 950, the controller 960, and the storage device 970 of the user equipment may operate according to a communication method of the user equipment as described above. However, components of the user equipment are not limited to the above-mentioned examples. For example, the user equipment may include more or less components than the above-mentioned components. Also, the transceiver 950, the controller 960, and the storage device 970 may be implemented in a form of one chip. Also, the controller 960 may include at least one processor.

Referring to the non-limiting example of FIG. 9B, transceiver 950 refers collectively to a receiver 956 of the user equipment and a transmitter 953 of the user equipment, and may transmit and receive signals to and from a base station. Signals that are transmitted to and received from the base station may include control information and data. To transmit and receive signals to and from the base station, the transceiver 950 may be composed of an RF transmitter for up-converting a frequency of a signal to be transmitted and amplifying the signal, and an RF receiver for low-noise amplifying a received signal and down-converting a frequency of the received signal. However, the RF transmitter and the RF receiver are certain embodiments of the transceiver 950, and components of the transceiver 950 are not limited to the RF transmitter and the RF receiver.

Also, the transceiver 950 may receive a signal through a wireless channel, output the signal to the controller 960, and transmit a signal output from the controller 960 through the wireless channel.

The storage device 970 may store programs and data required for operations of the user equipment. Also, the storage device 970 may store control information or data included in a signal acquired by the user equipment. The storage device 970 may be configured with storage media, such as ROM, RAM, a hard disc, CD-ROM, and a DVD, or a combination of the storage media.

The controller 960 may control a series of processes such that the user equipment operates according to the above-described embodiments of the disclosure. For example, the controller 960 may receive a control signal and a data signal through the transceiver 950, and process the received control signal and data signal. Also, the controller 960 may transmit the processed control signal and data signal through the transceiver 950.

According to certain embodiments of the disclosure, an apparatus and method capable of effectively providing a one-to-one communication service in a wireless communication system may be provided.

Although the present disclosure has been described with various embodiments, various changes and modifications may be suggested to one skilled in the art. It is intended that the present disclosure encompass such changes and modifications as fall within the scope of the appended claims.

What is claimed is:

1. A method for performing unicast communication, by a first user equipment (UE), the method comprising:
transmitting a direct communication request message including information about a PC5 Quality of Service (QoS) Flow for establishing a PC5 unicast link;
receiving, from a second UE, a response message including a corresponding information about the PC5 QoS Flow requested by the first UE based on a result of an establishment of the PC5 unicast link; and
transmitting, to the second UE, a data message over the PC5 unicast link by using a profile for the PC5 unicast link, wherein the information about PC5 QoS Flow includes a PC5 QoS Flow identifier (PFI) and a PC5 5$^{th}$ generation (5G) QoS Indicator (PQI), and wherein the profile includes at least one of: a Layer-2 identifier (ID) of the first UE, an application layer ID of the first UE, a Layer-2 ID of the second UE, an application layer ID of the second UE, a PC5 5$^{th}$ generation (5G) Quality of Service (QoS) Indicator (PQI), or a PC5 QoS Flow identifier (PFI) associated with the PQI.

2. The method of claim 1, wherein the Layer-2 ID of the second UE and the Layer-2 ID of the first UE are used for initial signaling to establish the PC5 unicast link, and wherein a destination Layer-2 ID of the direct communication request message is the Layer-2 ID of the second UE.

3. The method of claim 2, wherein the destination Layer-2 ID is equal to or different from Vehicle to Everything (V2X) service types.

4. The method of claim 1, wherein the PFI is assigned in a V2X layer of the first UE, and wherein the V2X layer of the first UE provides at least one of the data message, the PFI, or the PQI to an Access Stratum (AS) layer of the first UE.

5. The method of claim 1, further comprising indicating, from a V2X layer to an AS layer, whether the direct communication request message or the response message is for signaling.

6. The method of claim 1, further comprising changing at least one of: the Layer-2 ID of the first UE, the Layer-2 ID of the second UE, the application layer ID of the first UE, or the application layer ID of the second UE.

7. The method of claim 6, further comprising updating the profile based on an update of a link layer identifier or a result of the changing of at least one of: the Layer-2 ID of the first UE, the Layer-2 ID of the second UE, the application layer ID of the first UE, or the application layer ID of the second UE.

8. A first user equipment (UE) for performing unicast communication, the first UE comprising:

a transceiver; and at least one processor coupled with the transceiver and configured to:

transmit a direct communication request message including information about a PC5 Quality of Service (QoS) Flow for establishing a PC5 unicast link;

receive, from a second UE, a response message including a corresponding information about the PC5 QoS Flow requested by the first UE based on a result of an establishment of a the PC5 unicast link; and transmit, to the second UE, a data message over the PC5 unicast link by using a profile for the PC5 unicast link, wherein the information about PC5 QoS Flow includes a PC5 QoS Flow identifier (PFI) and a PC5 5th generation (5G) QoS Indicator (PQI), and wherein the profile includes at least one of: a Layer-2 identifier (ID) of the first UE, an application layer ID of the first UE, a Layer-2 ID of the second UE, an application layer ID of the second UE, a PC5 5th generation (5G) Quality of Service (QoS) Indicator (PQI), or a PC5 QoS Flow identifier (PFI) associated with the PQI.

9. The first UE of claim 8, wherein the Layer-2 ID of the second UE and the Layer-2 ID of the first UE are used for initial signaling to establish the PC5 unicast link, and wherein a destination Layer-2 ID of the direct communication request message is the Layer-2 ID of the second UE.

10. The first UE of claim 9, wherein the destination Layer-2 ID is equal to or different from Vehicle to Everything (V2X) service types.

11. The first UE of claim 8, wherein the PFI is assigned in a V2X layer of the first UE, and wherein the V2X layer of the first UE provides at least one of the data message, the PFI, or the PQI to an Access Stratum (AS) layer of the first UE.

12. The first UE of claim 8, wherein the at least one processor is further configured to indicate, from a V2X layer to an AS layer, whether the direct communication request message or the response message is for signaling.

13. The first UE of claim 8, wherein the at least one processor is further configured to change at least one of: the Layer-2 ID of the first UE, the Layer-2 ID of the second UE, the application layer ID of the first UE, or the application layer ID of the second UE.

14. The first UE of claim 13, wherein the at least one processor is further configured to update the profile based on update of a link layer identifier or a result of the change of at least one of: the Layer-2 ID, the application layer ID of the first UE, or the application layer ID of the second UE.

* * * * *